US012676781B2

(12) United States Patent
Ge et al.

(10) Patent No.: US 12,676,781 B2
(45) Date of Patent: Jul. 7, 2026

(54) METHOD OF DETECTING OTFS SCMA SIGNALS AND RECEIVER IMPLEMENTING THE METHOD

(71) Applicants: AUMOVIO Germany GmbH, Frankfurt am Main (DE); NANYANG TECHNOLOGICAL UNIVERSITY, Singapore (SG)

(72) Inventors: Yao Ge, Singapore (SG); Yong Liang Guan, Singapore (SG); David González González, Frankfurt am Main (DE)

(73) Assignees: AUMOVIO Germany GmbH, Hannover (DE); NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 19/147,815

(22) PCT Filed: Jan. 15, 2024

(86) PCT No.: PCT/IB2024/050375
§ 371 (c)(1),
(2) Date: Jul. 14, 2025

(87) PCT Pub. No.: WO2024/154037
PCT Pub. Date: Jul. 25, 2024

(65) Prior Publication Data
US 2026/0113231 A1 Apr. 23, 2026

(30) Foreign Application Priority Data

Jan. 18, 2023 (DE) ..................... 10 2023 200 370.8
Apr. 19, 2023 (DE) ..................... 10 2023 109 929.9

(51) Int. Cl.
*H04L 27/26* (2006.01)
*H04L 25/02* (2006.01)

(52) U.S. Cl.
CPC .... *H04L 27/26532* (2021.01); *H04L 25/0202* (2013.01)

(58) Field of Classification Search
CPC ..................... H04L 27/26532; H04L 25/0202
See application file for complete search history.

(56) References Cited

U.S. PATENT DOCUMENTS 12,119,979 B2 * 10/2024 Chen ........................ H04L 1/005
12,155,593 B2 * 11/2024 Patchava ............. H04L 25/0226
(Continued)

FOREIGN PATENT DOCUMENTS

CN    104767535 A    7/2015
CN    111224906 A    6/2020
(Continued)

OTHER PUBLICATIONS

"5G; Study on channel model for frequencies from 0.5 to 100 Ghz (3GPP TR 38.901 version 14.0.0 Release 14)" ETSI TR 138 901 V14.0.0, (May 2017), pp. 1-90.
(Continued)

*Primary Examiner* — Dac V Ha
(74) *Attorney, Agent, or Firm* — Buchanan Ingersoll & Rooney PC

(57) ABSTRACT

A method of detecting superimposed SCMA signals from multiple user equipment in a receiver of an OTFS communication system includes initializing an executing an iteration loop, in which a mean of all a posteriori estimates of the transmitted signal determined so far is calculated, which a posteriori estimates are based on the OTFS-demodulated received signal, the corresponding channel matrix, and the mean vectors and variances determined for each UE. The
(Continued)

mean of all a posteriori estimates determined so far is used for determining vectors and variances for each UE, further using the probabilities of the non-zero elements of the respective UEs codebooks. The iteration is repeated until a termination criterion is met.

18 Claims, 9 Drawing Sheets

(56) References Cited

U.S. PATENT DOCUMENTS

| | | | |
|---|---|---|---|
| 12,177,057 B2 * | 12/2024 | Sathyanarayan ...... H01Q 19/06 |
| 2018/0262306 A1 | 9/2018 | Hadani et al. |
| 2020/0119868 A1 | 4/2020 | Rakib et al. |
| 2020/0259692 A1 | 8/2020 | Hadani et al. |

FOREIGN PATENT DOCUMENTS

| | | |
|---|---|---|
| CN | 111901069 A | 11/2020 |
| CN | 113067666 A | 7/2021 |
| CN | 113395221 A | 9/2021 |
| CN | 113852580 A | 12/2021 |

OTHER PUBLICATIONS

Hadani et al., "Orthogonal Time Frequency Space Modulation", 2017 IEEE Wireless Communications and Networking Conference (WCNC), (Mar. 2017), pp. 1-6.

Li et al., "A New Path Division Multiple Access for the Massive MIMO-OTFS Networks", IEEE Journal on Selected Areas in Communications, (Apr. 2021), vol. 39, No. 4. pp. 903-918.

Li et al., "Joint Channel Estimation and Data Detection for Hybrid RIS Aided Millimeter Wave OTFS Systems", IEEE Transactions on Communications, (Oct. 2022), vol. 70, No. 10, pp. 6832-6848.

Qu et al., "Efficient Channel Equalization and Symbol Detection for MIMO OTFS Systems", IEEE Transactions on Wireless Communications, (Aug. 2022), vol. 21, No. 8. pp. 6672-6686.

Shao et al., "A Complexity-Reduced QRD-SIC Detector for Interleaved OTFS", Journal of Latex Class Files, (Aug. 2015), vol. 14, No. 8, pp. 1-11.

Singh et al., "Low-Complexity LMMSE Receiver Design for Practical-Pulse-Shaped MIMO-OTFS Systems" IEEE Transactions on Communications, (Dec. 2022), vol. 70, No. 12, pp. 8383-8399.

Tiwari et al., "Low complexity LMMSE Receiver for OTFS", IEEE Communications Letters, (Dec. 2019), vol. 23, No. 12, pp. 2205-2209.

Examination Report issued Sep. 26, 2023, by the German Patent Office in corresponding German Patent Application No. 10 2023 109 929.9 and an English machine translation of the Examination Report. (12 pages).

Chatterjee et al., "Non Orthogonal Multiple Access with Orthogonal Time Frequency Space Signal Transmission," IEEE Syst. J., vol. 15, No. 1, Mar. 2021, pp. 1-12.

Deka et al., "OTFS-NOMA based on SCMA: A code-domain NOMA approach for orthogonal time frequency space modulation," IEEE Trans. Commun., vol. 69, No. 8, Aug. 2021, pp. 1-12.

Ding et al., "OTFS-NOMA: An Efficient Approach for Exploiting Heterogenous User Mobility Profiles," IEEE Trans. Commun., vol. 67, No. 11, Nov. 2019, pp. 1-30.

Ge et al., "Receiver Design for OTFS with Fractionally Spaced Sampling Approach" IEEE Transactions on Wireless Communications, vol. 20, 2021, No. 7, Jun. 2018, pp. 1-30.

Ge et al., "OTFS Signaling for Uplink NOMA of Heterogeneous Mobility Users," IEEE Trans. Commun., vol. 69, No. 5, May 2021, pp. 1-31.

International Search Report (PCT/ISA/210) and Written Opinion (PCT/ISA/237) mailed on Apr. 17, 2024, by the European Patent Office as the International Searching Authority for International Application No. PCT/IB2024/050375, 9 pages.

Li et al., "Doubly-Iterative Sparsified MMSE Turbo Equalization for OTFS Modulation", IEEE Transactions on Communications, vol. 71, No. 3, Mar. 2023, pp. 1-16.

Liu et al., "Memory AMP," IEEE Transactions of Information Theory, month unknown 2022, pp. 1-24.

Raviteja et al., "Low-Complexity Iterative Detection for Orthogonal Time Frequency Space Modulation", IEEE Wireless Communications and Networking Conference (WCNC), month unknown 2018, pp. 1-6.

Raviteja et al., "Embedded Pilot-Aided Channel Estimation for OTFS in Delay-Doppler Channels," IEEE Trans. Veh. Tech., vol. 68, No. 5, May 2019, pp. 1-10.

Raviteja et al., "Interference Cancellation and Iterative Detection for Orthogonal Time Frequency Space Modulation," IEEE Trans. Wireless Commun., vol. 17, No. 10, Oct. 2018, pp. 1-30.

Shan et al., "Orthogonal time frequency space detection via low-complexity expectation propagation," IEEE Transactions on Wireless Communications, vol. 21, No. 12, Dec. 2022, pp. 10887-10901.

Singh et al., "Low-Complexity ZF/MMSE Receivers for MIMO-OTFS Systems With Imperfect CSI", IEEE Open J. Commun. Soc., vol. 3, Oct. 2020, pp. 1-32.

Study on Channel Model for Frequencies From 0.5 to 100 GHZ. Standard 3GPP TR 38.901, month unknown 2017, pp. 1-103.

Thaj et al., "Low-Complexity Linear Diversity-Combining Detector for MIMO-OTFS," IEEE Wireless Commun. Lett., vol. 11, No. 2, Feb. 2022, pp. 1-5.

Xiang et al., "Gaussian approximate message passing detection of orthogonal time frequency space modulation," IEEE Transaction on Vehicular Technology, vol. 70, No. 10, Oct. 2021, pp. 10999-11004.

Xiao et al., "On capacity-based codebook design and advanced decoding for sparse code multiple access systems," IEEE Transactions on Wireless Communications, vol. 17, No. 6, Jun. 2018, pp. 3834-3849.

* cited by examiner

200

202

204

206

100

208

210

400

450    452    454    456

458

402

METHOD OF DETECTING OTFS SCMA SIGNALS AND RECEIVER IMPLEMENTING THE METHOD

CROSS REFERENCE TO RELATED APPLICATIONS

This application is the U.S. National Phase Application of PCT International Application No. PCT/IB2024/050375, filed Jan. 15, 2024, which claims priority to German Patent Application No. 10 2023 200 370.8, filed Jan. 18, 2023 and German Patent Application No. 10 2023 109 929.9, filed Apr. 19, 2023, the contents of such applications being incorporated by reference herein.

FIELD OF THE INVENTION

The present invention relates to the field of wireless communication, in particular to wireless communication in systems using non-orthogonal sparse code multiple access (SCMA) and orthogonal time frequency space (OTFS) modulation, including wireless communication systems implementing multiple-input multiple-output (MIMO) technology. More specifically, the present invention relates to detecting signals in such a wireless communication system in the presence of multi-dimensional interference including inter-symbol interference (ISI), inter-doppler interference (IDI) and inter-user interference (IUI) as found in high-mobility settings with a large number of users.

NOTATIONS

Throughout this specification, bold symbols represent vectors or matrices. Scalar values are denoted herein by lowercase letters in italics, as in x. Superscripts T and H, respectively denote the transpose and complex conjugate transpose of a vector or matrix.

BACKGROUND

The sixth generation (6G) wireless communications and beyond are expected to serve an ever-increasing number of high-mobility users, e.g., vehicles, subways, highways, trains, drones, low earth orbit (LEO) satellites, etc.

The preceding fourth and fifth generation (5G) wireless communications use orthogonal frequency division multiplexing (OFDM), which provides high spectral efficiency and high robustness against frequency selective fading channel, and also allow for using low-complexity equalisers. However, due to speed-dependent Doppler shifts or spreads and quickly varying multipath reception, high-mobility communications suffer from severe time and frequency dispersiveness. Time and frequency dispersiveness cause inter-carrier-interference (ICI) and signal fading at the receiver, and the fading is thus also referred to as doubly selective channel fading. Doubly selective channel fading significantly impairs the performance of OFDM communication.

As an alternative to OFDM, OTFS modulation was proposed as a solution for coping with doubly selective fading channels.

OTFS modulation is a 2D modulation scheme that multiplexes information-carrying QAM symbols over carrier waveforms that correspond to localized pulses in a signal representation that is referred to as delay-Doppler representation. The OTFS waveforms are spread over both time and frequency while remaining roughly orthogonal to each other under general delay-Doppler channel impairments. In theory, OTFS combines the reliability and robustness of spread spectrum with the high spectral efficiency and low complexity of narrowband transmission. OTFS exploits the diversity coming from both the channel delays and Doppler shifts for better performance. Thanks to the sparsity of the channel in the delay-Doppler domain, the required pilot and receiver complexity for channel estimation can be significantly reduced, as has been shown, e.g., by P. Raviteja, K. T. Phan, and Y. Hong, in "Embedded pilot-aided channel estimation for OTFS in delay-Doppler channels," IEEE Trans. Veh. Tech., vol. 68, no. 5, pp. 4906-4917, May 2019.

The OTFS waveforms couple with the wireless channel in a way that directly captures the underlying physics, yielding a high-resolution delay-Doppler Radar image of the constituent reflectors. As a result, the time-frequency selective channel is converted into an invariant, separable and orthogonal interaction, where all received symbols experience the same localized impairment and all the delay-Doppler diversity branches are coherently combined.

This renders OTFS ideally suited for wireless communication between transmitters and receivers that move at high speeds with respect to each other, e.g., receivers or transmitters located in high-speed trains, cars and even aircrafts.

However, the equivalent transmission of OTFS in the delay-Doppler domain involves a sophisticated two-dimensional periodic convolution, leading to severe inter-symbol interference. Therefore, effective yet simple signal detectors are rather important for OTFS systems to maintain the sufficient diversity of the wireless channel and achieve desired receiver performance with reasonable effort.

In addition, for further increasing the spectral efficiency and transmission reliability for high mobility scenarios, MIMO can be combined with OTFS. MIMO refers to a class of techniques for sending and receiving more than one data signal simultaneously over the same radio channel, using multiple transmission and receiving antennas, for exploiting multipath propagation, thereby multiplying the capacity of a radio link. Additionally, modern MIMO usage often refers to multiple data signals sent to different receivers with one or more receive antennas, though this is more accurately termed multi-user multiple-input single-output (MU-MISO).

In particular in vehicular communications, where a large number of users moving fast yet at different speeds and in different directions require radio access and communication, an overload situation in traditional access schemes like time division multiple access (TDMA) etc. can quickly occur. Such scenario may also be referred to as massive multiple access.

In order to improve massive user connectivity, i.e., allowing a large number of users to access the same wireless resources at the same time, and to improve spectrum utilization, non-orthogonal multiple access (NOMA) has been considered as a promising solution for high spectrum efficiency in traditional overloaded multi-user OFDM and MIMO systems. Existing NOMA methods are mainly categorized into power-domain and code-domain NOMA for distinguishing different users. The application of NOMA to OTFS can effectively improve spectrum utilization and support massive mobile connectivity, as has been shown by A. Chatterjee, V. Rangamgari, S. Tiwari, and S. S. Das, in "Nonorthogonal multiple access with orthogonal time-frequency space signal transmission," IEEE Syst. J., vol. 15, no. 1, pp. 383-394, March 2021, and Z. Ding, R. Schober, P. Fan and H. V. Poor, in "OTFS-NOMA: An efficient approach for exploiting heterogenous user mobility profiles, " IEEE Trans. Commun., vol. 67, no. 11, pp. 7950-7965, November 2019. In particular, sparse code multiple access (SCMA), which is a code-domain NOMA, may provide excellent performance and low receiver complexity, as discussed by K. Deka, A. Thomas, and S. Sharma, in "OTFS-SCMA: A code-domain NOMA approach for orthogonal time frequency space modulation," IEEE Trans. Commun., vol. 69, no. 8, pp. 5043-5058, August 2021. In OTFS-NOMA, the multiple mobile users are allowed to share the same delay-Doppler resources simultaneously, and are distinguished by either different power levels or with the through coding, e.g., sparse codewords.

An SCMA encoder maps $\log_2(M)$ bits to a K-dimensional codeword of size M selected from a predefined codebook. K dimensions are corresponding to K different orthogonal tones, such as OFDMA subcarriers. The K-dimensional codeword is a vector with only N<K nonzero entries. Users cannot transmit data through the subcarriers represented by the other N−K zero entries. Theoretically, each user can be allocated to more than one codebook, and each codebook can be utilized by more than one user generally. However, in this description it is assumed that each user employs only one SCMA layer.

FIG. 1 shows an example of SCMA encoding, with 6 layered codebooks CB1 . . . CB6 (variable nodes) and 4 subcarriers SC1 . . . SC4 (function nodes). Each row denotes a dimension, and each column means a 4-dimensional codeword. In each codebook, the constellation size is 4, which means there are 4 different codewords that can be chosen. The white or empty entries denote the zero elements and the patterned entries denote the non-zero elements in the codebooks. For example, in Codebook 1, the entries in the first row are patterned and the entries in the third row are white, which means the first dimension is non-zero and third dimension is zero. In each codebook, there are 2 non-zero dimensions with patterned lattice. In an AWGN channel, the signal received in the base station is the superposition of the codewords selected from the codebooks, indicated by the combined pattern in each subcarrier.

Existing NOMA implementations provide poor performance when it comes to managing radio access for groups of radio-connected mobile user equipment (UE), in particular in multi-user (MU) systems, including MU-MIMO systems. A major challenge for OTFS multi-user systems is the data detection at the receiver due to the substantial increase of the system's dimension. Moreover, the additional inter-user interference, which causes a burden on the channel equalization, requires a high processing complexity and complicated processing at the receiver.

FIG. 2 shows an exemplary schematic scenario of multiple radio-connected highly mobile UEs. Here, a number of vehicles on a road are temporarily connected to one of the road side units (RSU) simultaneously, e.g., through wireless connections in accordance with the IEEE802.11 p/WAVE standard, indicated by the serrated lightning bolts. The RSUs are connected with a central node and, ultimately to the internet, through suitable communication networks, indicated by the double-pointed arrows. Modern vehicle communication for safety and other purposes has tremendous transmission needs, and the mobility of the UEs causes doubly-selective fading, i.e., time-selectiveness due to Doppler spread and frequency selectiveness due to delay spread. While OTFS at least in part addresses the doubly-selective fading, efficient detectors are required at least in the RSUs, for achieving a desired performance in MU systems.

SUMMARY OF THE INVENTION

It is, therefore, desirable to provide a method of and a detector for efficiently detecting signals from a multiplicity of users in an OTFS SCMA communication system in the presence of multi-dimensional interference including ISI, IDI and IUI. It is further desirable to provide a method of receiving binary data sequences from multiple UEs transmitted as OTFS SCMA signals in the presence of multi-dimensional interference including ISI, IDI and IUI.

This need is addressed by the method of detecting superimposed OTFS SCMA signals from multiple UEs presented in claim 1, the detector of claim 10, the method of receiving binary data sequences presented in claim 11, the wireless receiver of claim 12, and the computer program product of claim 15. A corresponding computer-readable storage medium is presented in claim 16. Embodiments and developments of the methods and apparatus, respectively, are provided in the respective dependent claims.

An aspect of the invention will be described in the following assuming an exemplary MIMO OTFS SCMA system with j independent mobile UEs transmitting signals to the base station (BS) simultaneously. A corresponding exemplary schematic block diagram of the system is shown in FIG. 3.

Without loss of generality, each UE 300 is equipped with one transmit antenna 312 and the BS is equipped with U receive antennas. Some of the various elements comprised in a UE 300 are represented in the dashed-line box in the figure. For clarity, only one box is shown around the elements of the multiple UEs.

At each transmit slot, every $\log_2 Q$ information bits $b_j$ from the j-th UE are mapped, in an SCMA mapper 302, into a K-dimensional sparse codeword $$c_j = \left[ c_j^1, c_j^2, \ldots, c_j^K \right]^T$$

selected from a user-specific SCMA codebook $A_j$ of size Q, where j={1,2, . . . , J} and J>K typically, leading to an overloading factor $$\zeta = \frac{J}{K} > 1.$$

It is assumed that each UE employs only one SCMA layer and further only D(D<K) non-zero entries among the K-dimensional codeword $c_j$ are assumed. The information symbols in the delay-Doppler plane $X_j \in \mathbb{C}^{M \times N}$ of the j-th UE 300 are generated by allocating MN/K SCMA codewords $c_j$ either along the delay axis or along the Doppler axis without overlapping. M and N are numbers of resource grids along the delay and Doppler dimensions, respectively. For simplicity, it is assumed that M and N are integer multiples of K, i.e., $[M]_K=[N]_K=0$, where $[\bullet]_K$ denotes the mod-k operation. The transmission scheme for each UE 300 is based on OTFS to counter the doubly-selective fading channels caused by channel delays and Doppler shifts.

At the transmitter 300, the transmitted time domain signal in OTFS can be obtained, in OTFS modulator 306, by first applying the inverse symplectic finite Fourier transform (ISFFT) on the delay-Doppler symbols $X_j \in \mathbb{C}^{M \times N}$, converting them into the time-frequency domain symbols $\bar{X}_j \in \mathbb{C}^{M \times N}$ for each UE 300, $$\bar{X}_j = F_M X_j F_N^H, \tag{1a}$$

5 where $F_M \in \mathbb{C}^{M \times M}$ and $F_N \in \mathbb{C}^{N \times N}$ represent normalized M-point and N-point fast Fourier transform (FFT) matrices, respectively.

Applying a Heisenberg transform and assuming a rectangular transmit pulse $g_{tx}(t)$, the output of the Heisenberg transform can be given by $$S_j = F_M^H \left( F_M X_j F_N^H \right) = X_j F_N^H, \tag{1b}$$

where $F_M \in \mathbb{C}^{M \times M}$ and $F_N \in \mathbb{C}^{N \times N}$ represent normalized M-point and N-point fast Fourier transform (FFT) matrices, respectively.

The transmitted time domain signal $s_j \in \mathbb{C}^{MN \times 1}$ is generated by column-wise vectorization of $S_j$:

$$s_j[c] = \sum_{n=0}^{N-1} \sum_{m=0}^{M-1} \overline{X}_j[m, n] g_{tx}(cT_s - nT) e^{j2\pi m\Delta f(cT_s - nT)}, \tag{2}$$

$$c = 0, \dots, MN - 1.$$

where T (seconds) and $\Delta f = 1/T$ (Hz) are chosen to be larger than the maximal channel delay spread and maximum Doppler frequency shift, respectively. The system sampling interval is $T_s = 1/M\Delta f$.

A cyclic prefix (CP) is then added, in CP adder 308, in front of the generated time domain signal for each UE 300. After passing through a transmit filter 310, the resulting time domain signal of each UE 300 is sent out simultaneously over the doubly-selective fading channels. The various blocks or elements of the transmitter referred to above by their reference numerals are also shown in FIG. 9.

Referring again to FIG. 3, the BS 400 receives the signals from the multiple UEs 300, filters the received signals in a receive filter 404, removes cyclic prefixes added at the transmitters, and performs OTFS demodulation in OTFS demodulator 406. The demodulated OTFS signals are provided to a multi-user detection stage 408, in accordance with an aspect of the present invention, for recovering the signals of each UE 300. Finally, the SCMA code words of each UE 300 are de-mapped in SCMA de-mapper 410, and the transmitted information made available at output 412. The process steps carried out in the receiver, or components thereof, will now be described in greater detail.

The impulse response channel between j-th UE 300 and u-th receive antenna is characterized as $$h_{uj}[c, p] = \sum_{i=1}^{L_{uj}} h_{uj,i} e^{j2\pi v_{u,j,i}(cT_s - pT_s)} P_{rc}(pT_s - t_j - \tau_{uj,i}), \tag{3}$$

$$c = 0, \dots, MN - 1; p = 0, \dots, P_{uj} - 1,$$

where $L_{uj}$ is the number of multipaths between the j-th UE 300 and the u-th receive antenna, and $t_j$ denotes the timing offset experienced by the j-th UE 300; $h_{uj,i}$, $\tau_{uj,i}$ and $v_{uj,i}$ represent the channel gain, delay and Doppler frequency shift associated with the i-th path, respectively. The Doppler frequency shift $v_{uj,i}$ can be further expressed as $v_{uj,i} = (k_{uj,i} + \beta_{uj,i})/NT$, where integer $k_{uj,i}$ and real $\beta_{uj,i} \in (-0.5, 0.5]$ respectively stand for the index and fractional part of $v_{uj,i}$.

In equation (3), $P_{rc}(\bullet)$ is an equivalent overall raised-cosine (RC) rolloff filter when the typical root raised-cosine (RRC) pulse shaping filters are applied at the transmitter and receiver. The maximal channel tap $P_{uj}$ is determined by the duration of the overall filter response and the maximum channel delay spread. To overcome the inter-frame interference, a CP is appended that is sufficiently long to accommodate both the maximum timing offset and maximal channel delay spread of all UEs 300.

As mentioned before, the received time domain signal first enters a receive filter. After discarding the CP the received signal from the j-th UE 300 at the u-th receive antenna can be expressed as $$r_{uj}[c] = \sum_{p=0}^{P_{uj}-1} h_{uj}[c, p] s_j[[c - p]_{MN}], c = 0, \dots, MN - 1. \tag{4}$$

The resulting signal $r_{uj} \in \mathbb{C}^{MN \times 1}$ is first devectorized into a matrix $R_{uj} \in \mathbb{C}^{M \times N}$, then processed to generate a time-frequency signal $Y_{uj} \in \mathbb{C}^{M \times N}$ by applying a Wigner transform with a receive pulse $g_{rx}(t)$, $$\overline{Y}_{u_j}[m, n] = \sum_{c=0}^{MN-1} g_{rx}^*(cT_s - nT) r_{uj}[c] e^{-j2\pi m\Delta f(cT_s - nT)}, \tag{5}$$

$$m = 0, \dots, M - 1; n = 0, \dots, N - 1.$$

Finally, the delay-Doppler domain signal is obtained by applying a symplectic finite Fourier transform (SFFT), $$Y_{uj} = F_M^H \overline{Y}_{uj} F_N. \tag{6}$$

For simplicity, a rectangular pulse for $g_{tx}(t)$ and $g_{rx}(t)$ in is used the above steps, for which the end-to-end delay-Doppler domain input-output model from j-th UE 300 to the u-th receive antenna is given by $$Y_{uj}[\ell, k] = \sum_{p=0}^{P_{uj}-1} \sum_{i=1}^{L_{uj}} \sum_{q=0}^{N-1} h_{uj,i} P_{rc}(pT_s - t_j - \tau_{uj,i}) \tag{7}$$

$$\gamma(k, \ell, p, q, k\_(uj, i), \beta\_(uj, i) \times X_j[[\ell - p]_M, [k - k_{uj,i} + q]_N],$$

where $$\gamma(k, \ell, p, q, k_{uj,i}, \beta_{uj,i}) \tag{8a}$$

$$= \begin{cases} \dfrac{1}{N} \xi(\ell, p, k_{uj,i}, \beta_{uj,i}) \theta(q, \beta_{uj,i}), & p \le \ell < M, \\[2mm] \dfrac{1}{N} \xi(\ell, p, k_{uj,i}, \beta_{uj,i}) \theta(q, \beta_{uj,i}) \phi(k, q, k_{uj,i}), & 0 \le \ell < p, \end{cases} \tag{8b}$$

$$\xi(\ell, p, k_{uj,i}, \beta_{uj,i}) = e^{j2\pi \left( \frac{\ell - p}{M} \right) \left( \frac{k_{uj,i} + \beta_{uj,i}}{N} \right)}, \tag{8c}$$

$$\theta(q, \beta_{uj,i}) = \frac{e^{-j2\pi(-q - \beta_{uj,i})} - 1}{e^{-j\frac{2\pi}{N}(-q - \beta_{uj,i})} - 1}, \tag{8d}$$

$$\phi(k, q, k_{uj,i}) = e^{-j2\pi \frac{[k - k_{uj,i} + q]_N}{N}}.$$

The input-output model in equation (7) can be further expressed in vector form as $$y_{uj} = H_{uj}\tilde{x}_j, \qquad (9)$$

where $\tilde{x}_j, y_{uj} \in \mathbb{C}^{MN \times 1}$, and $H_{uj} \in \mathbb{C}^{MN \times MN}$ is a sparse matrix.

Therefore, the received signal at the u-th receive antenna is given by $$\bar{y}_u = \sum_{j=1}^{J} H_{uj}\tilde{x}_j + \omega_u, \qquad (10a)$$

$$= \overline{H}_u \overline{x} + \omega_u, \qquad (10b)$$

where $u = \{1, 2, \ldots, U\}$, $\overline{H}_u = [H_{u1}, H_{u2}, \ldots, H_{uJ}] \in \mathbb{C}^{MN \times MNJ}$, and $$\overline{x} = [\tilde{x}_1^T, \tilde{x}_2^T, \ldots, \tilde{x}_J^T]^T \in \mathbb{C}^{MNJ \times 1} \cdot \omega_u \in \mathbb{C}^{MN \times 1} \sim \mathcal{CN}(0, \sigma^2 I)$$

is the complex additive white Gaussian noise (AWGN) at the u-th receive antenna.

It is to be noted that x is a sparse vector and the number of non-zero entries in $\overline{x}$ is only $$\frac{MNJD}{K} \cdot x \in \mathbb{C}^{\frac{MNJD}{K} \times 1}$$

denotes the effective input vector after removing zeros and grouping every D non-zero elements from the same SCMA codeword in $\overline{x}$. Similar operations are applied to the corresponding columns in $\overline{H}_u$ for obtaining the effective matrix $$H_u \in \mathbb{C}^{MN \times \frac{MNJD}{K}}.$$

Thus, equation (10) can be rewritten as $$\qquad (11)$$

$$\bar{y}_u = H_u x + \omega_u, u = 1, 2, \ldots, U,$$

$$\text{where } x = [x_1^T, x_2^T, \ldots, x_{MNJ/K}^T]^T \in \mathbb{C}^{\frac{MNJD}{K} \times 1}, x_c \in \mathbb{C}^{D \times 1},$$

$$h_{d,c}^u \in \mathbb{C}^{1 \times D} \text{ and } H_u = \begin{bmatrix} h_{1,1}^u & h_{1,2}^u & \cdots & h_{1,MNJ/K}^u \\ h_{2,1}^u & h_{2,2}^u & \cdots & h_{2,MNJ/K}^u \\ \vdots & \vdots & \ddots & \vdots \\ h_{MN,1}^u & h_{MN,2}^u & \cdots & h_{MN,MNJ/K}^u \end{bmatrix} \in \mathbb{C}^{MN \times \frac{MNJD}{K}}.$$

By stacking the received vectors in (11) as $$y = [\bar{y}_1^T, \bar{y}_2^T, \ldots, \bar{y}_U^T]^T \in \mathbb{C}^{UMN \times 1},$$

the input-output model of the MIMO-OTFS SCMA system is given by $$y = Hx + \omega, \qquad (12)$$

where $$H = [H_1^T, H_2^T, \ldots, H_U^T]^T \in \mathbb{C}^{UMN \times \frac{MNJD}{K}} \text{ and } \omega =$$

$$[\omega_1^T, \omega_2^T, \ldots, \omega_U^T]^T \in \mathbb{C}^{UMN \times 1}.$$

For convenience, define $$\mathcal{N} = \frac{MNJD}{K}$$

and $\mathcal{M} = UMN$, respectively.

Signal detection can be performed using known linear receiver designs such as the one presented by P. Singh, A. Gupta, H. B. Mishra, and R. Budhiraja, in "Low-complexity ZF/MMSE MIMO-OTFS receivers for high-speed vehicular communication," IEEE Open J. Commun. Soc., vol. 3, pp. 209-227, 2022. It is also conceivable to use the more advanced receiver presented by Y. Ge, Q. Deng, P. Ching, and Z. Ding, in "OTFS signaling for uplink NOMA of heterogeneous mobility users," IEEE Trans. Commun., vol. 69, no. 5, pp. 3147-3161, May 2021. Other known receivers that may be used include low-complexity Gaussian approximate message passing (GMP) receivers with empirical damping for multi-user detection, such as presented by P. Raviteja, K. T. Phan, Y. Hong, and E. Viterbo, in "Interference cancellation and iterative detection for orthogonal time frequency space modulation," IEEE Trans. Wireless Commun., vol. 17, no. 10, pp. 6501-6515, October 2018, or by L. Xiang, Y. Liu, L.-L. Yang, and L. Hanzo, in "Gaussian approximate message passing detection of orthogonal time frequency space modulation," IEEE Trans. Veh. Tech., vol. 70, no. 10, pp. 10 999-11 004, October 2021. Yet another type of receivers that may be used includes expectation propagation (EP) receivers, likewise with empirical damping for multi-user detection, as proposed by Y. Shan, F. Wang, and Y. Hao, in "Orthogonal time frequency space detection via low-complexity expectation propagation," IEEE Trans. Wireless Commun., 2022.

However, the known receiver designs tend to either have an acceptable computational efficiency, while providing low performance, or provide an acceptable performance only at unacceptable computational complexity.

Thus, in accordance with an aspect of the invention, a Low-Complexity Memory Approximate Message Passing (LCM-AMP) detector is presented for recovering each UE's signal from the received signal at the BS. The system model discussed further above and ultimately developed into equation (12) can be represented by a factor graph, in which each factor node y is connected to multiple variable nodes $x_c$, with $c = 1, 2, \ldots, MNJ/K.$ A schematic block diagram of the processing applied to the nodes of the factor graph is shown in FIG. 4. At the factor node operations including, e.g., an LMMSE estimation with Taylor expansion approximation, are carried out. The operations at the factor node use the information available at the BS 400, including intermediate results of calculations of each of the UEs 300 as they become available in each iteration. Using the Taylor expansion approximation avoids having to use a computationally highly complex matrix inverse, which adds to the computational efficiency of the process. The operations at the factor node can be considered to provide a result akin to a matched filter, with a low computational complexity. The results of the operations at the factor node are orthogonalized and provided to the variable nodes. At each variable node operations including, e.g., Bayesian denoising, are carried out using information pertaining to a respective UE 300, including intermediate results of calculations of the BS 400 as they become available in each iteration. The results of the operations at the variable nodes are provided to the factor node after orthogonalization and damping, the latter being applied for improving the convergence of the process. In accordance with an aspect of the invention the messages updated and passed between the factor node y and variable nodes x, $c=1,2,\ldots,MNJ/K$ on the factor graph are approximated as Gaussian, which reduces the computational complexity over the use of exact messages.

An iterative processing loop is executed between the factor node y and the respective variable nodes $x_c$ until a termination criterion is met. The iteration count is indicated by the superscript (t).

From factor node y to variable nodes $x_c$: At the factor node y, an a posteriori estimate $\bar{z}$ of the effective input vector x is determined, which effective input vector is obtained after removing zeros and grouping every D non-zero elements from the same SCMA codeword. A posteriori estimates $\bar{z}$ can be obtained, e.g., by applying the linear minimum mean square error (LMMSE) criterion:

$$\bar{z}^{(t)} = \mu^{(t)} + H^H\left(\rho_t I + HH^H\right)^{-1}\left(y - H\mu^{(t)}\right), \tag{13}$$

where $$\rho_t = \sigma^2 \big/ \eta_{t,t} \cdot \mu^{(t)} \in \mathbb{C}^{\frac{MNJD}{K}} \times 1$$

and $\eta_{t,t}$ are the mean vector and variance received from variable nodes in the (t−1)-th iteration, respectively.

To avoid the large complexity of the matrix inverse in equation (13), the following Lemmas are introduced for simplicity.

Lemma 1. Assume that the matrix (I–C) is invertible and the spectral radius of C satisfies $\rho(C)<1$. Then, $$(I - C)^{-1} = \lim_{t\to\infty}\sum_{i=0}^{t} C^i$$

Lemma 2. Starting with t=1 and $r^{(0)}=0$, the recursive process $r^{(t)}=Cr^{(t-1)}+x$ can be used for approximating $$\sum_{i=0}^{t} C^i x^{t\to\infty}(I - C)^{-1}x.$$

Based on Lemma 1 and Lemma 2, define $$\bar{r}^{(t)} = \left[I - \theta_t\left(\rho_t I + HH^H\right)\right]\bar{r}^{(t-1)} + \xi_t\left(y - H\mu^{(t)}\right), \tag{14}$$

where $\theta_t$ is a relaxation parameter to guarantee that the spectral radius of $[I-\theta_t(\rho_t I+HH^H)]$ is less than 1. It is verified that $\theta_t=(\lambda^++\rho_t)^{-1}$ with $\lambda^+=(\lambda_{max}+\lambda min)/2$ satisfies such condition, where $\lambda_{max}$ and $\lambda_{min}$ are the maximal and minimal eigenvalues of $HH^H$, respectively. In addition, the weight $\xi_t$ is chosen and optimized to accelerate the convergence of Memory AMP detector. For convenience, define $B=\Delta^+I-HH^H$ and yield $\theta_t B=I-\theta_t(\rho_t I+HH^H)$.

It is to be noted that the complexity of calculating $\lambda_{max}$ and $\lambda_{min}$ is as high as that of the matrix inverse. A simple bound approximation of maximum and minimum eigenvalues that can be applied without performance loss is presented by L. Liu, S. Huang, and B. M. Kurkoski, in "Memory AMP," IEEE Trans. Inf. Theory, 2022.

Starting with t=1 and $\mu^{(1)}=\bar{r}^{(0)}=0$, equation (13) can be approximately rewritten as $$z^{(t)} = \mu^{(t)} + H^H\bar{r}^{(t)} \tag{15a}$$

$$= \underbrace{\sum_{i=1}^{t}\phi_{t,i}H^H B^{t-i}y}_{Q_t} + \sum_{i=1}^{t}\underbrace{(-\phi_{t,i}A_{t-i})\mu^{(i)}}_{F_{t,i}} + \mu^{(t)}, \tag{15b}$$

where equation (15b) follows the recursive process of equation (14).

Define $$A_t = H^H B^t H \text{ and } \phi_{t,i} = \begin{cases} \xi_t, & i = t \\ \xi_i\prod_{j=i+1}^{t}\theta_j, & i < t \end{cases}.$$

From equation (15b), it can be observed that all the preceding messages $\{\rho^{(t)}\}$ are utilized for the estimation. Thus, the traditional orthogonality principle between the current input and output estimation errors applied in non-memory orthogonal approximate message passing (OAMP) and vector approximate message passing (VAMP), e.g., as presented by T. Thaj and E. Viterbo, in "Low-complexity linear diversity-combining detector for MIMO-OTFS," IEEE Wireless Commun. Lett., vol. 11, no. 2, pp. 288-292, February 2022, and expectation propagation (EP), e.g., as presented by Z. Ding, R. Schober, P. Fan, and H. V. Poor, in "OTFS-NOMA: An efficient approach for exploiting heterogenous user mobility profiles," IEEE Trans. Commun., vol. 67, no. 11, pp. 7950-7965, November 2019, is not sufficient to guarantee the asymptotic independent identically distributed (IID) Gaussianity of estimation errors generally required in a Memory AMP process. Consequently, a stricter orthogonality is required, i.e., the current output estimation error is required to be orthogonal to all preceding input estimation errors. Following the orthogonalization rule discussed by L. Liu, S. Huang, and B. M. Kurkoski, in "Memory AMP," IEEE Trans. Inf. Theory, 2022, the extrinsic mean vector of the estimation can be generated, given by $$r^{(t)} = \frac{1}{\varepsilon_t}\left(z^{(t)} - \sum_{i=1}^{t} c_{t,i}\mu^{(i)}\right), \tag{16}$$

where $$\varepsilon_t = 1 - \sum_{i=1}^{t} c_{t,i}, a_t = \frac{1}{N}tr\{A_t\} \text{ and } c_{t,i} = \begin{cases} 1-\phi_{t,t}a_0, & i = t \\ -\phi_{t,i}a_{t-i}, & i < t \end{cases}.$$

The validity can be shown as follows:

Following the orthogonalization rule, $$c_{t,i} = \frac{1}{N} tr\{F_{t,i}\} = -\frac{1}{N} tr\{\phi_{t,i} A_{t-i}\} = -\phi_{t,i} a_{t-i},$$

for $i < t$.

Similarly, $$c_{t,t} = \frac{1}{N} tr\{I + F_{t,t}\} = -\frac{1}{N} tr\{I - \phi_{t,t} A_0\} = -\phi_{t,t} a_0, \text{ for } i = t.$$

Calculating $$\varepsilon_t = \frac{1}{N} tr\{Q_t H\} = \frac{1}{N} tr\left\{\sum_{i=1}^{t} \phi_{t,i} H^H B^{t-i} H\right\} =$$

$$\sum_{i=1}^{t} \phi_{t,i} \frac{1}{N} tr\{A_{t-i}\} = \sum_{i=1}^{t} \phi_{t,i} a_{t-i} = 1 - \sum_{i=1}^{t} c_{t,i}$$

completes the proof.

Without loss of generality, the extrinsic mean vector $r^{(t)}$ can further be denoted as $$r^{(t)} = \left[\left(r_1^{(t)}\right)^T, \left(r_2^{(t)}\right)^T, \dots, \left(r_{MNJ/K}^{(t)}\right)^T\right]^T \in \mathbb{C}^{\frac{MNJD}{K} \times 1},$$

where $$r_c^{(t)} \in \mathbb{C}^{D \times 1}.$$

Next, the extrinsic variance of the estimation can be approximately calculated by $$\tau_{t,t} = \frac{1}{\mathcal{N}} \mathbb{E}\left\{\left\| r^{(t)} - x \right\|_2^2\right\} \tag{17a}$$

$$= \frac{1}{\mathcal{N}} \mathbb{E}\left\{\left\| \frac{1}{\varepsilon_t}\left[Q_t y + \sum_{i=1}^{t} E_{t,i}\mu^{(i)}\right] - x \right\|_2^2\right\} \tag{17b}$$

$$= \frac{1}{\mathcal{N}} \mathbb{E}\left\{\left\| \frac{1}{\varepsilon_t}\left(Q_t \omega + \sum_{i=1}^{t} E_{t,i} f^{(i)}\right)\right\|_2^2\right\} \tag{17c}$$

where $\mathbb{E}\{\bullet\}$ denotes the expectation operation and $E_{t,i} = \phi_{t,i}(a_{t-i}I - A_{t-i})$. Further define the estimation error of $\mu^{(i)}$ as $f^{(i)} = \mu^{(i)} - x$, where $\mathbb{E}\{f^{(i)}(f^{(i)})^H\} = \eta_{i,j}I$ Assuming the noise vector $\omega$ is independent with $\{f^{(i)}\}$, we can further simplify equation (17) as $$\tau_{t,t} = \lim_{\mathcal{N} \to \infty} \frac{1}{\mathcal{N}\varepsilon_t^2}\left(Q_t\omega + \sum_{i=1}^{t} E_{t,i}f^{(i)}\right)^H \left(Q_t\omega + \sum_{i=1}^{t} E_{t,i}f^{(i)}\right) \tag{18a}$$

$$= \frac{1}{\varepsilon_t^2}\left[\sigma^2 \frac{1}{\mathcal{N}} tr\{Q_t^H Q_t\} + \sum_{i=1}^{t}\sum_{j=1}^{t} \eta_{i,j}\frac{1}{\mathcal{N}} tr\{E_{t,i}^H E_{t,j}\}\right] \tag{18b}$$

$$= \frac{1}{\varepsilon_t^2}\sum_{i=1}^{t}\sum_{j=1}^{t} \phi_{t,i}\phi_{t,j}\left(\sigma^2 a_{2t-i-j} + \eta_{i,j}\bar{a}_{t-i,t-j}\right) \tag{18c}$$

$$= \frac{\varpi_{t,1}\xi_t^2 - 2\varpi_{t,2}\xi_t + \varpi_{t,3}}{a_0^2(\varpi_{t,0} + \xi_t)^2} \tag{18d}$$

using the following notations:

$$\bar{a}_{i,j} = \lambda^+ a_{i+j} - a_{i+j+1} - a_i a_j, \quad \varpi_{t,0} = -\sum_{i=1}^{t-1} c_{t,i}/a_0,$$

$$\varpi_{t,1} = \sigma^2 a_0 + \eta_{t,t}\bar{a}_{0,0}, \quad \varpi_{t,2} = -\sum_{i=1}^{t-1} \phi_{t,i}\left(\sigma^2 a_{t-i} + \eta_{t,i}\bar{a}_{0,t-i}\right) \text{ and } \varpi_{t,3} =$$

$$\sum_{i=1}^{t-1}\sum_{j=1}^{t-1} \phi_{t,i}\phi_{t,j}\left(\sigma^2 a_{2t-i-j}^{-1} + \eta_{i,j}\bar{a}_{t-i,t-j}\right).$$

The optimal parameter t is obtained by minimizing $\tau_{t,t}$. Since $\tau_{t,t}(\xi_t)$ is differentiable with respect to t except at the point $\xi_t = -\varpi_{t,0}$, but $\tau_{t,t}(-\varpi_{t,0}) = +\infty$. Therefore, the optimal $\xi_t$ is either $\pm\infty$ or $\partial\tau_{t,t}(\xi_t)/\partial\xi_t = 0$. As a result, the optimal solution can be set as $\xi^*_1 = 1$ and for $t \geq 2$, $$\xi_t^* = \begin{cases} \frac{\varpi_{t,0}\varpi_{t,2} + \varpi_{t,3}}{\varpi_{t,0}\varpi_{t,1} + \varpi_{t,2}}, & \varpi_{t,0}\varpi_{t,1} + \varpi_{t,2} \neq 0 \\ +\infty, & \text{otherwise} \end{cases}. \tag{19}$$

The extrinsic mean $$r_c^{(t)}$$

and variance $$\tau_{t,t}(\xi_t^*)$$

are finally delivered to variable nodes $x_c, c = 1, 2, \dots, MNJ/K$.

From variable nodes $x_c, c = 1, 2, \dots, MNJ/K$ to factor node y: At each variable node, the a posteriori probability can be expressed as $$\bar{P}^{(t)}(x_c = \chi_j) \propto P_D(x_c = \chi_j) \exp\left(-\frac{\left\|\chi_j - r_c^{(t)}\right\|_2^2}{\tau_{t,t}(\xi_t^*)}\right), \forall \chi_j \in \bar{\mathbb{A}}_j, \tag{20}$$

where $$j = \left\lceil \frac{cK}{MN} \right\rceil$$

and $\lceil \bullet \rceil$ denotes the round up operation. $\bar{\mathbb{A}}_j$ is a set that contains the non-zero elements of $\mathbb{A}_j$, and $\chi_j$ is a D-dimensional codeword from $\bar{\mathbb{A}}_j$. $P_D(x_c = \chi_j)$ denotes the a priori probability and is assumed to be equiprobable for all symbols if no prior information is available at the receiver. The a posteriori probability is then projected into a series of Gaussian distributions $$\mathcal{CN}\left(g_c^{(t)}[i], \delta_c^{(t)}[i]\right), i = 1, 2, \dots, D,$$

with $$g_c^{(t)}[i] = \sum_{\chi_j \in \bar{\mathbb{A}}_j} \bar{P}^{(t)}(x_c = \chi_j)\chi_j[i], \tag{21a}$$

-continued $$\delta_c^{(t)}[i] = \sum_{\chi_j \in \bar{\mathbb{A}}_j} \bar{P}^{(t)}(x_c = \chi_j)|\chi_j[i]|^2 - |g_c^{(t)}[i]|^2. \tag{21b}$$

For simplicity, the simple average of the variance is determined for further use, i.e., $$\delta = \frac{1}{\mathcal{N}} \sum_{c=1}^{MNJ/K} \sum_{i=1}^{D} \delta_c^{(t)}[i].$$

Following the Gaussian message combing rule employed by Y. Ge, Q. Deng, P. Ching, and Z. Ding, in "OTFS signaling for uplink NOMA of heterogeneous mobility users," IEEE Trans. Commun., vol. 69, no. 5, pp. 3147-3161, May 2021, the extrinsic variance and mean given by $$\bar{\eta}_{t+1,t+1} = [(\delta)^{-1} - (\tau_{t,t}(\xi_t^*))^{-1}]^{-1}, \tag{22a}$$

$$\bar{\mu}_c^{(t+1)}[i] = \bar{\eta}_{t+1,t+1} \left[ \frac{g_c^{(t)}[i]}{\delta} - \frac{r_c^{(t)}[i]}{\tau_{t,t}(\xi_t^*)} \right] \tag{22b}$$

are updated.
As a result, $$\bar{\mu}^{(t+1)} = \left[ \left(\bar{\mu}_1^{(t+1)}\right)^T, \left(\bar{\mu}_2^{(t+1)}\right)^T, \dots, \left(\bar{\mu}_{MNJ/K}^{(t+1)}\right)^T \right]^T \in \mathbb{C}^{\frac{MNJD}{K} \times 1}.$$

To guarantee the convergence and improve the performance of the detector algorithm, a damping vector $\Lambda_{t+1} = [\Lambda_{t+1,1}, \Lambda_{t+1,2}, \dots, \Lambda_{t+1,t+1}]^T$ is applied under the constraint of $$\sum_{i=1}^{t+1} \Lambda_{t+1,i} = 1.$$

Therefore, the variable nodes further update the mean vector $\mu^{(t+1)}$ as $$\mu^{(t+1)} = \left[ \mu^{(1)}, \mu^{(2)}, \dots, \mu^{(t)}, \bar{\mu}^{(t+1)} \right] \cdot \Lambda_{t+1}. \tag{23}$$

Next, the extrinsic variance can be approximately updated by $$\eta_{t+1,t+1} = \frac{1}{\mathcal{N}} \mathbb{E}\left\{ \left\| \mu^{(t+1)} - x \right\|_2^2 \right\} = \Lambda_{t+1}^H \bar{V}_{t+1} \Lambda_{t+1} \tag{24}$$

where $$\bar{V}_{t+1} = \begin{bmatrix} & & \bar{\eta}_{1,t+1} \\ V_t & & \vdots \\ \bar{\eta}_{t+1,1} & \cdots & \bar{\eta}_{t+1,t+1} \end{bmatrix}_{(t+1)\times(t+1)} \text{ with } V_t = [\eta_{i,j}]_{t\times t}, \ 1 \le i \le j \le t.$$

For $1 \le t' \le t$, it is possible to calculate $$\bar{\eta}_{t+1,t'} = \frac{1}{\mathcal{N}} \mathbb{E}\left\{ \left[ \bar{\mu}^{(t+1)} - x \right]^H f(t') \right\}, \tag{25}$$

-continued $$\approx \lim_{\mathcal{N}\to\infty} \left[ \frac{1}{\mathcal{N}} \left(y - H\bar{\mu}^{(t+1)}\right)^H \left(y - H\mu^{(t')}\right) - \frac{\mathcal{M}\sigma^2}{\mathcal{N}} \right]/a_0, \tag{26}$$

where $\bar{\eta}_{t',t+1}$ is equal to the conjugate of $\bar{\eta}_{t+1,t'}$.

Different from the heuristic damping methods used in in the prior art detectors introduced further above, the detector in accordance with an aspect of the invention solves the optimization problem of equations (27a) and (27b), which are based on equation (24), for obtaining the solution of damping vector $\Lambda_{t+1}$, $$\min_{\Lambda_{t+1}} \frac{1}{2} \Lambda_{t+1}^H \bar{V}_{t+1} \Lambda_{t+1} \tag{27a}$$

$$\text{s.t. } 1^T \Lambda_{t+1} = 1 \tag{27b}$$

where 1 is an all-one vector. As $\nabla_{t+1}$ is a positive semidefinite matrix in general, the problem expressed by equation (27) is a convex optimization problem and can be easily solved. It is verified that the optimal solution is given by $$\Lambda_{t+1}^* = \begin{cases} \frac{(\bar{\nu}_{t+1})^{-1} 1}{1^T (\bar{\nu}_{t+1})^{-1} 1}, & \text{if } \bar{V}_{t+1} \text{ is invertible} \\ [0, 0, \dots, 1, 0]^T, & \text{otherwise} \end{cases} \tag{28}$$

Following equation (28), the variance can be updated straightforwardly in accordance with $$\eta_{t',t+1} = \eta_{t+1,t'} = \eta_{t+1,t+1} = \begin{cases} \frac{1}{1^T (\bar{\nu}_{t+1})^{-1} 1}, & \text{if } \bar{V}_{t+1} \text{ is invertible} \\ \eta_{t,t}, & \text{otherwise} \end{cases} \tag{29}$$
$$\text{for } 1 \le t' \le t$$

Finally, $\mu^{(t+1)}$ and $\eta_{t+1,t'}$, $1 \le t' \le t+1$ are passed back to the factor node.

It is noted that a maximum damping length L (i.e., the number of non-zero entries in $\Lambda_{t+1}$) is considered here instead of full damping, where L=3 or 2 is sufficient for a desired performance.

The iterations in the Memory AMP detector are terminated when the desired convergence or the maximum iteration number $\mathcal{T}$ is reached. Convergence may be reached when the difference between an a posteriori estimate $\bar{z}^{(t)}$ of the transmitted signal x of a current iteration and an immediately preceding iteration lies below a predetermined value, when the a posteriori variance $$\delta_c^{(t)}[i]$$

drops below a predetermined value, and/or when the difference between an a posteriori estimate $\bar{z}^{(t)}$ of the transmitted signal x of a current iteration and a current-iteration extrinsic mean $$r_c^{(t)}$$

lies below a predetermined value

Ultimately, decisions on the transmitted symbols can be made and the SCMA de-mapping can be carried out for recovering the transmitted information bits of each UE.

The detecting process as carried out between the factor node and the variable nodes can be briefly summarized as Input: $y$, $H$, $\lambda_{min}$, $\lambda_{max}$, $L$ and $\mathcal{T}$.

Initialization: $\mu^{(1)} = \bar{r}^{(0)} = 0$, $\lambda^+ = (\lambda max + \lambda_{min})/2$, $$\eta_{1,1} = \left( \frac{1}{\mathcal{N}} y^H y - \frac{\mathcal{M}\sigma^2}{\mathcal{N}} \right)/a_0$$

and iteration count $t=1$.

Iteratively repeat:

1 The factor node $y$ generates the extrinsic mean $$r_c^{(t)}$$

from equation (16) and the extrinsic variance $$\tau_{t,t}(\xi_t^*)$$

from equation (18d), then delivers them to the variable nodes $x_c$, $c=1,2,\ldots,MNJ/K$ 2 The variable nodes $x_c$, $c=1,2,\ldots,MNJ/K$ calculate the mean vector $\mu^{(t+1)}$ as per equation (23) and the variances $\eta+_{t+1,t'}$, $1 \leq t' \leq t+1$ as per equation (29), and passes them back to the factor node $y$ 3 $t:=t+1$ until the termination criterion is met.

Then the decisions on the information bits for each user are output.

Thus, in accordance with the first aspect of the invention, a method of detecting superimposed SCMA signals from multiple UEs, wirelessly received by a receiver of an OTFS communication system, comprises receiving an OTFS-demodulated signal $y$ representing the received signals from all UEs, and receiving a corresponding channel matrix $H$. If the SCMA signals are received by a multi-antenna receiver, the demodulated signal $y$ represents the signal from all antennas of the multi-antenna receiver and from all UEs. The method further comprises, after a corresponding initialization, executing an iteration loop for determining the signals transmitted by each UE. The iteration loop comprises determining an a posteriori estimate $\bar{z}^{(t)}$ of the transmitted signal $x$, using the demodulated signal $y$, the channel matrix $H$, as well as mean vectors $\mu^{(t-1)}$ and associated variances $\eta_{t,t-1}$ determined for each UE in a respective immediately preceding iteration or, in the first iteration, determined for each UE in the initialization, as inputs. Next, a current-iteration extrinsic mean $$r_c^{(t)}$$

is determined from all a posteriori estimates $\bar{z}^{(t)}$ determined so far, including the current iteration. Further, current-iteration extrinsic variances $$\tau_{t,t}(\xi_t^*)$$

are determined. Based on the current-iteration extrinsic mean $$r_c^{(t)}$$

and the corresponding current-iteration extrinsic variances $$\tau_{t,t}(\xi_t^*),$$

which may likewise be averaged, current-iteration a posteriori probabilities $\bar{P}^{(t)}$ are determined for each UE and for each of the non-zero elements of the respective UE's SCMA codebook $\mathbb{A}_{j,j}$. The a posteriori probability $\bar{P}^{(t)}$ indicates the likelihood that an element from the SCMA codebook is one of those elements that were superimposed and form the received signal. From the current-iteration probabilities $\bar{P}^{(t)}$ and corresponding variances $$\delta_c^{(t)}[i]$$

a current-iteration a posteriori Gaussian distribution $$g_c^{(t)}[i]$$

is calculated for each UE and over all of the non-zero elements of the respective UE's SCMA codebook $\mathbb{A}_{j,j}$. The current-iteration a posteriori Gaussian distribution $$g_c^{(t)}[i]$$

is then used for updating the respective mean vector $\mu^{(t)}$ and the corresponding extrinsic variances $\eta_{t,t}$ of each UE. The iteration loop is repeated until a termination criterion is met.

In one or more embodiments initializing comprises setting the first-iteration mean vectors $\mu^{(1)}$ and the first-iteration extrinsic mean $$r_c^{(1)}$$

to zero.

In one or more embodiments initializing comprises receiving one or more of a damping length $L$, a maximum number of iterations $\mathcal{T}$, and/or the minimal and maximal eigenvalues $\lambda_{min}$, $\lambda_{max}$, of the product of the channel matrix and its complex conjugate transpose ($HH^H$) as further input. The iteration count $t$ may be set to 1, and/or $\lambda^+$ may be set to the mean of the minimal and maximal eigenvalues $\lambda_{min}$, $\lambda_{max}$, of the product of the channel matrix and its complex conjugate transpose $HH^H$ during initializing.

In one or more embodiments determining the a posteriori estimate $\bar{z}^{(t)}$ of the transmitted signal $x$ comprises applying finite terms of matrix Taylor series to approximate the matrix inverse in linear minimum mean square error.

In one or more embodiments updating the elements of the respective mean vector $\mu^{(t)}$ and the corresponding extrinsic variances $\eta_{t,t}$ comprises applying Gaussian message combining.

In one or more embodiments the current-iteration variances $$\delta_c^{(t)}[i]$$

of the current-iteration a posteriori probabilities $\overline{P}^{(t)}$ are averaged for updating the elements of the respective mean vector $\mu^{(t)}$ and the corresponding extrinsic variances $\eta_{t,r}$.

In one or more embodiments the iteration is terminated after a predetermined number of iterations. Alternatively, or additionally, the iteration may be terminated when the difference between an a posteriori estimate $\overline{z}^{(t)}$ of the transmitted signal x of a current iteration and an immediately preceding iteration lies below a predetermined value. Another additional or alternative termination criterion may be met when the difference between an a posteriori estimate $\overline{z}^{(t)}$ of the transmitted signal x of a current iteration and a current-iteration extrinsic mean $$r_c^{(t)}$$

lies below a predetermined value, or when the a posteriori variance $$\delta_c^{(t)}[i]$$

drops below a predetermined value.

In one or more embodiments the damping length L is adapted based on the SNR of the received signal. In particular the damping length may be reduced with decreasing SNR. This may reduce the computational complexity when an increased damping length does not yield an increased BER over a certain number of iterations.

In accordance with a second aspect of the present invention a detector of a receiver arranged for receiving superimposed OTFS-modulated SCMA signals from multiple UEs is presented. The detector comprises one or more software and/or hardware blocks configured for receiving an OTFS-demodulated signal y representing the received signals from all UEs and for receiving a corresponding channel matrix H. The detector further comprises one or more software and/or hardware blocks configured for initializing and executing an iteration loop implementing the repeatedly iterated steps of the method in accordance with the first aspect of the invention, for detecting SCMA signals of individual UEs in the received superimposed OTFS-modulated SCMA signals, and for outputting the detected SCMA signals to an SCMA de-mapper.

In accordance with a third aspect of the present invention a method of receiving binary data sequences simultaneously transmitted by multiple UEs as OTFS-modulated SCMA signals comprises subjecting the received OTFS signal to an OTFS demodulation. A channel estimation is then performed on the demodulated signal. The demodulated signal and the channel information obtained by the channel estimation are provided to a process of detecting superimposed SCMA signals from multiple UEs in the received signal in accordance with the first aspect of the invention. The output of the detection process, i.e., the detected SCMA signals, are de-mapped, and binary data is reconstructed from the de-mapped detected SCMA signals.

A corresponding wireless receiver 400 of an OTFS communication system in accordance with a fourth aspect of the invention comprises one or more antennas 402 for receiving superimposed OTFS-modulated SCMA signals from multiple UEs via an OTFS communication channel. The received signals are provided to an OTFS demodulator block 404 configured for outputting a received signal (y), representing the received signals from all UEs. The demodulated OTFS signal is provided to a channel estimator block 406, which is configured to output an estimation of the channel's coefficients to a signal detector block 408. Signal detector block 408 is configured to detect SCMA signals from individual UEs and to output detected SCMA signals to an SCMA de-mapper block 410. SCMA de-mapper block 410 provides de-mapped signals to a channel decoder block 414, whose output is a reconstructed version of the binary data sequences transmitted by the respective UEs. The various blocks may be implemented in hardware and/or in software. Notably the demodulator block 404, the channel estimator block 406, the signal detector block 408 and the SCMA de-mapper block 410 may be implemented as software executed by a microprocessor, hardware blocks or modules, e.g., dedicated computing hardware under control of a microprocessor, or a combination thereof. The various blocks referred to above by their reference numerals are shown in FIG. 9.

The wireless receiver may comprise one or more microprocessors 450, volatile 452 and non-volatile 454 memory, which are physically or logically interconnected with the software or hardware blocks or modules, or the combination thereof, that implement the OTFS demodulator block 404, the channel estimator block 406, the signal detector block 408, the SCMA de-mapper block 410, and the channel decoder block 414. The non-volatile memory 454 stores computer program instructions which, when executed by the one or more microprocessors 450, configure the one or more microprocessors 450 to control the software or hardware blocks or modules, or the combination thereof, to execute the method in accordance with the first or third aspect of the invention. The various elements referred to above by their reference numerals are shown in FIG. 12.

The methods described hereinbefore may be represented by computer program instructions. Accordingly, a computer program product comprises computer program instructions which, when executed by a microprocessor of a receiver, cause the microprocessor to execute methods in accordance with the first or third aspects of the present invention, and to accordingly control hardware and/or software blocks or modules of the receiver of an OTFS communication system in accordance with the first or third aspects of the invention as presented above.

The computer program instructions may be retrievably stored or transmitted on a computer-readable medium or data carrier. The medium or the data carrier may by physically embodied, e.g., in the form of a hard disk, solid state disk, flash memory device or the like. However, the medium or the data carrier may also comprise a modulated electromagnetic, electrical, or optical signal that is received by the computer by means of a corresponding receiver, and that is transferred to and stored in a memory of the computer.

As the equivalent channel matrix H is a sparse matrix and only matrix-vector multiplications are involved in the proposed Memory AMP detector proposed herein the detector has a relatively low complexity, and the detector may be referred to as Low-Complexity Memory AMP (LCM-AMP) detector. Specifically, the complexity of the proposed LCM- AMP in each iteration is mainly dominated by equations (14), (15a), (20), (21), (22) and (26), which require a complexity order $$O(UMN(S_B + S_H)), O(UMNS_H), O\left(\frac{MNJDQ}{K}\right),$$

$$O\left(\frac{2MNJDQ}{K}\right), O\left(\frac{2MNJD}{K}\right) \text{ and } O(UMN(S_H + 1)),$$

respectively. $S_B$ and $S_H$ represent the average number of non-zero entries in each row of B and H, respectively. The overall computational complexity of the proposed LCM-AMP is $$O\left(\left(UMN(S_B + 3S_H + 1) + \frac{MNJD(2 + 3Q)}{K}\right)\mathcal{T}\right).$$

A further reduction of the computational complexity is achieved by replacing the large-scale matrix inverse by finite terms of matrix Taylor series.

To summarize, a detailed complexity comparison of the known GMP detector, EP detector, OAMP/VAMP detector and the proposed LCM-AMP is illustrated in Table 1. It is obvious that the proposed LCM-AMP can achieve comparable complexity with GMP and EP detectors, whose respective performance is inferior, however. While the OAMP/VAMP detector has a comparable performance, the computational complexity of the LCM-AMP detector is significantly lower.

Doppler frequency shift $v_{max}$=1111 Hz. Further, the channel Doppler shift is generated by using the Jakes formulation as discussed by Y. Ge, Q. Deng, P. Ching, and Z. Ding, in "Receiver design for OTFS with a fractionally spaced sampling approach," IEEE Trans. Wireless Commun., vol. 20, no. 7, pp. 4072-4086, July 2021 or by P. Raviteja, K. T. Phan, Y. Hong, and E. Viterbo, in "Interference cancellation and iterative detection for orthogonal time frequency space modulation," IEEE Trans. Wireless Commun., vol. 17, no. 10, pp. 6501-6515, October 2018, i.e., $v_{uj,i} = v_{max} \cos(\varrho_{uj,i})$, $\forall u,j,i$, where $\varrho_{uj,i}$ is uniformly distributed over $[-\pi, \pi]$.

First the convergence and the effects of the damping length on the proposed LCM-AMP detector performance are investigated. FIG. 5 illustrates the bit error rate (BER) performance of the proposed LCM-AMP detector versus the number of iterations for different damping lengths L. It can be observed that the BER decreases monotonically and converges within a certain number of iterations. It can also be noticed that no significant performance improvement occurs for damping lengths L>3. Thus, in the following simulations L=3 and $\mathcal{T}$=6 are assumed for simplicity.

FIG. 6 further shows the effects of the eigenvalue bounds approximation on the proposed LCM-AMP detector performance with different numbers of BS antennas. It is obvious that the proposed LCM-AMP with approximate eigenvalue bounds can achieve similar performance as one using exact eigenvalues—the diamonds and crosses indicating the approximated and exact eigenvalues, respectively, are located superimposed and are indistinguishable. This strongly supports the effectiveness of such approximation in Memory AMP. It can also be noted that the BER perfor-

| Detectors | Computational Complexity | Performance |
|---|---|---|
| LCM-AMP | $\mathcal{O}\left(\left(UMN(S_B + 3S_H + 1) + \frac{MNJD(2 + 3Q)}{K}\right)\mathcal{T}\right)$ | Bayes optimized |
| EP | $\mathcal{O}\left(\left(UMN(6S_H D + S_H DQ) + \frac{2MNJDQ}{K}\right)\mathcal{T}\right)$ | Sub optimized |
| GMP | $\mathcal{O}((UMN(3S_H DQ + 2S_H))\mathcal{T})$ | Sub optimized |
| OAMP VAMP | $\mathcal{O}\left(\left(\left(\frac{MNJD}{K}\right)^3 + \left(\frac{MNJD}{K}\right)^2 + UMN(6S_H D + S_H DQ + S_H) + \frac{2MNJDQ}{K}\right)\mathcal{T}\right)$ | Bayes optimized |

The performance of the proposed LCM-AMP detector in MIMO-OTFS SCMA systems will be discussed in the following section. The carrier frequency is assumed to be centered at 4 GHz and the subcarrier spacing is $\Delta f$=15 kHz. The RRC rolloff factor is set to 0.4 for both the transmitter and receiver. Unless otherwise stated, the delay Doppler plane has the dimensions M=32 and N=16. It is further assumed that J=6 users are simultaneously sharing K=4 orthogonal resources, and the BS has U=4 receive antennas. In the simulation the SCMA codebooks are designed as presented by K. Xiao, B. Xia, Z. Chen, B. Xiao, D. Chen, and S. Ma, in "On capacity-based codebook design and advanced decoding for sparse code multiple access systems," IEEE Trans. Wireless Commun., vol. 17, no. 6, pp. 3834-3849, June 2018, with size Q=4 and D=2 non-zero entries in each codeword. A typical urban channel model as found in *"Study on Channel Model for Frequencies From 0.5 to 100 GHz."* Standard 3GPP TR 38.901, 2017, is adopted with exponential power delay profile. The velocity of each user is set to 300 km/h, resulting in a maximum mance improves as the number of BS antennas increases, which is due to the additional spatial diversity.

FIG. 7 shows a comparison of the BER performance of different detectors for the exemplary MIMO-OTFS SCMA system. The results reveal that the performance of all detectors improves with higher signal-to-noise ratio (SNR). It is also visible that the performance of traditional GMP and EP detectors are very sensitive to the damping parameters, which may even cause a significant error floor if no damping is applied. However, the proposed LCM-AMP detector (referred to as Memory AMP in the figure) achieves similar performance to that of the OAMP/VAMP detector—the diamonds and crosses of the two detectors being superimposed and indistinguishable in the figure—even if a low-complexity matched filter is used, and outperforms both the GMP and EP detectors. This analysis further demonstrates that the proposed LCM-AMP detector can yield a practical implementation advantage by achieving a good performance at low complexity.

FIG. 8 shows a comparison of the BER performance of the proposed LCM-AMP for different user velocities under various settings of M and N. As the user velocities increase, the BER performance first improves slightly and then saturates for velocities beyond 300 km/h. This is due to the fact that OTFS modulation can resolve a larger number of distinct paths in the Doppler domain for higher velocity, leading to performance benefits. It can also be observed that the BER performance degrades as M and N decrease, especially for higher SNR. This is attributed to the diversity loss caused by the lower resolution of OTFS delay-Doppler grid.

The LCM-AMP proposed herein is suitable, in particular, for large scale MIMO-OTFS SCMA systems with inherent channel sparsity. Replacing the traditional large-scale matrix inverse with finite terms of matrix Taylor series and the limitation to matrix-vector multiplications helps achieving low complexity and improves computational tractability. Utilizing all the preceding messages in the iteration process, which ensures that the estimation errors in the LCM-AMP are asymptotically independent identically distributed (IID), for maintaining orthogonality in the LCM-AMP detecting process helps countering performance degradation that may result from positive reinforcement in the iteration stage.

Unlike previous detector designs, the multi-user capable Memory AMP detector presented herein provides a good balance between computational efficiency and receiver performance, which may translate into reduced equipment cost and may, thus, promote the use of MIMO-OTFS systems using SCMA, which show beneficial properties for massively simultaneous high-mobility communication environments and exhibit an excellent spectral efficiency. In addition to the reduced complexity of the detector proposed herein, the optimized damping suggested herein, fixed or dynamically variable, can further improve the receiver performance.

The multi-user capable Memory AMP detector presented herein makes advantageous use of the diversity occurring in the delay, Doppler and spatial domains for improving the performance.

The method and apparatus proposed herein can be used with great advantage in mobile communications such as vehicle-to-everything (V2X), high-speed railway communication systems, low earth orbit (LEO) satellite communications, communications with unmanned aerial vehicles (UAV), in particular in swarm settings, massive machine-type Internet-of-Things (IoT) communications, e.g., in wireless factory and other industrial settings, extra-large scale MIMO and OFDM systems, and even in underwater acoustic communications.

While aspects of the invention have been described herein using an exemplary MIMO OTFS SCMA system it is obvious to the skilled person having read and understood this specification that the principles and methods developed and presented above also apply to general MU systems that use single antennas at the receiver and/or transmitter.

BRIEF DESCRIPTION OF THE DRAWING

The figures in the attached drawing are used for detailing aspects of the present invention. In the drawing

In the figures, identical or similar elements may be referenced using the same reference designators.

DETAILED DESCRIPTION OF EMBODIMENTS

Figure 1:
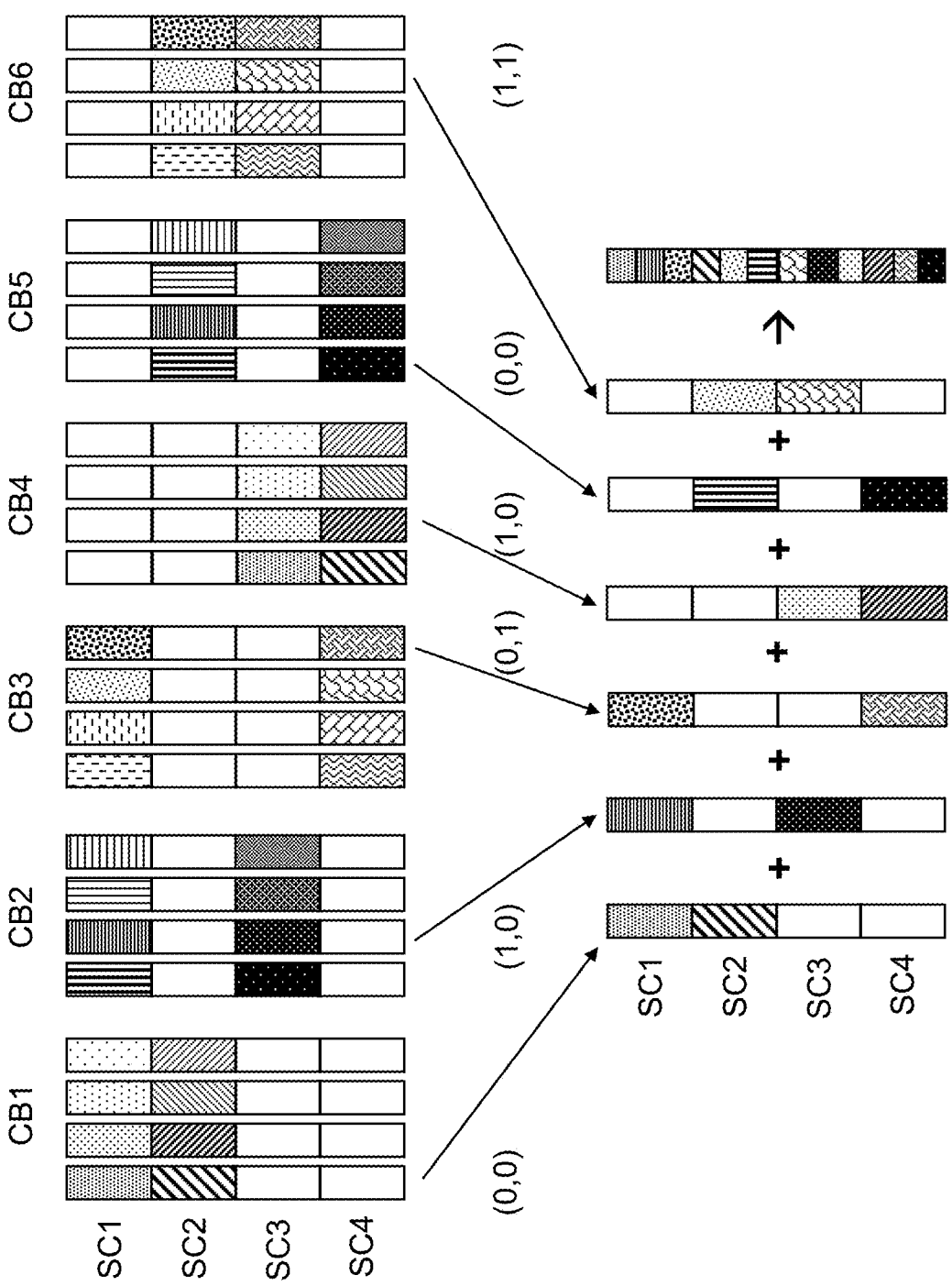
FIG. 1 shows an example of SCMA encoding with 6 layered codebooks and 4 subcarriers, FIG. 2 an exemplary schematic scenario of multiple radio-connected highly mobile UEs.
Figure 2:
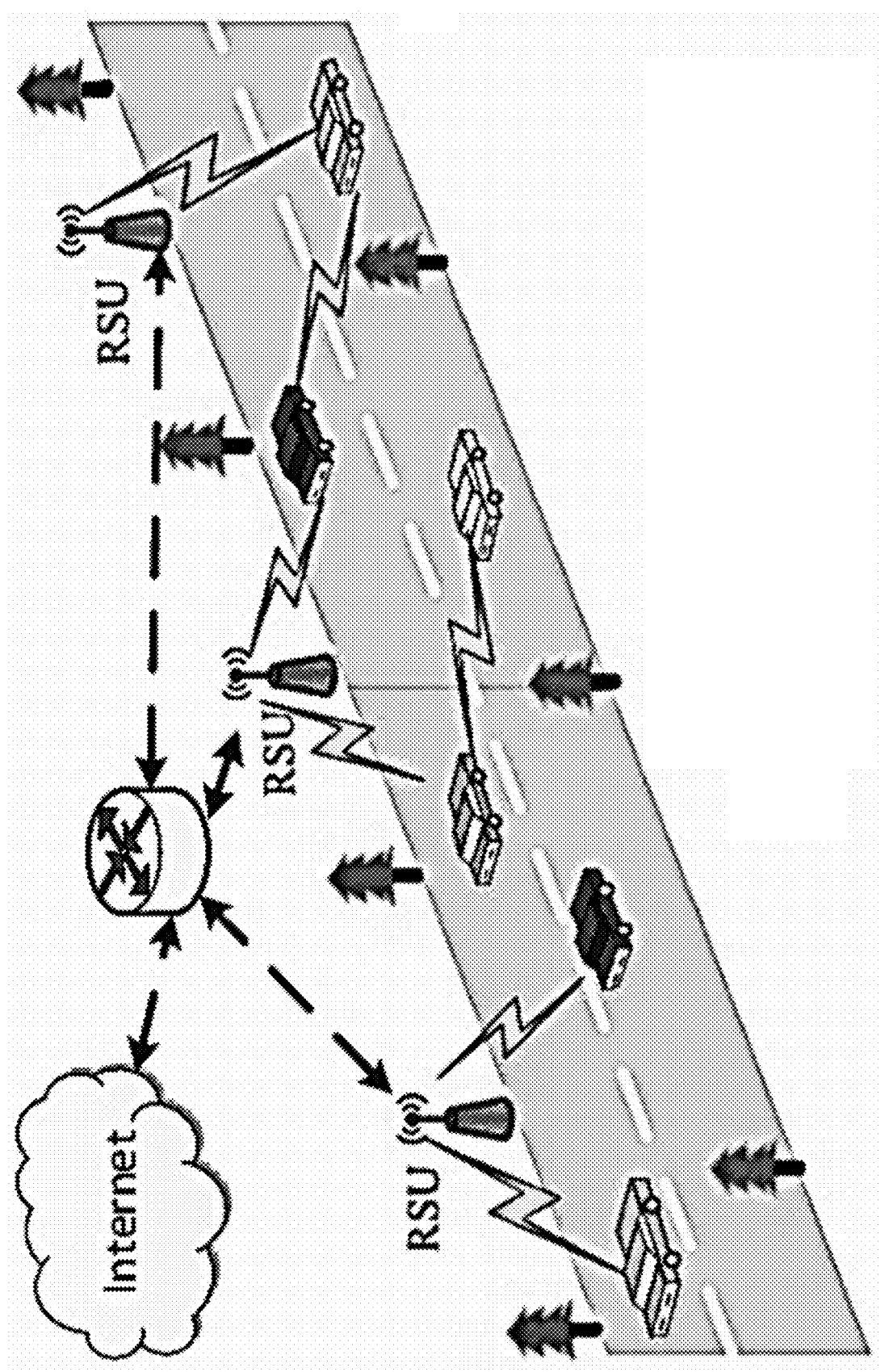
Figure 3:
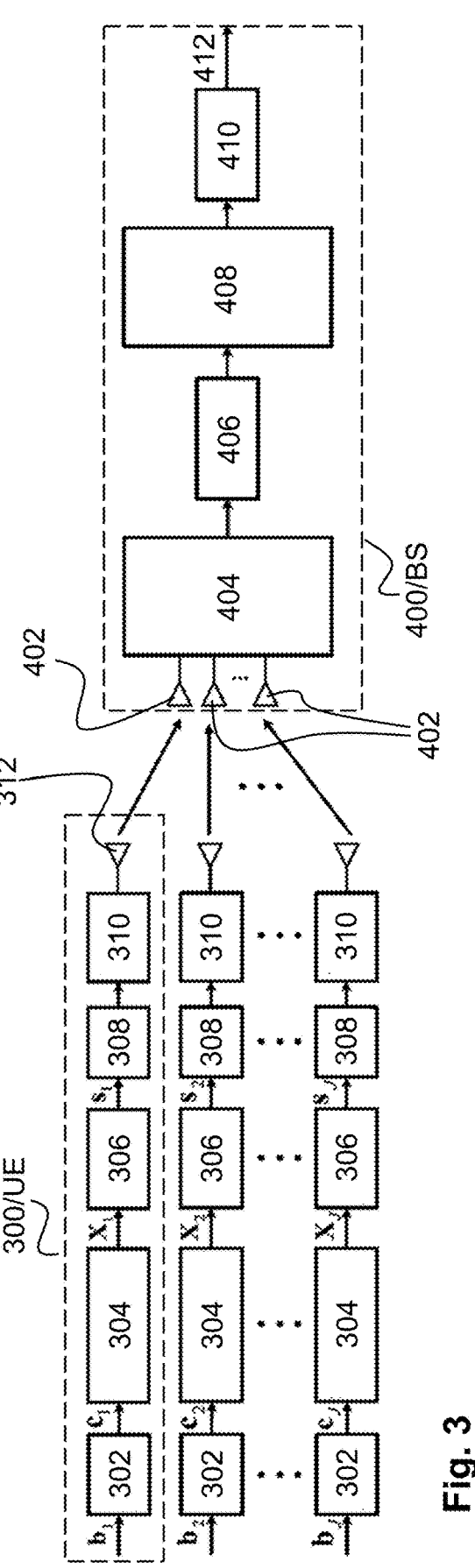
FIG. 3 shows an exemplary schematic block diagram of a MIMO OTFS SCMA system.
Figure 4:
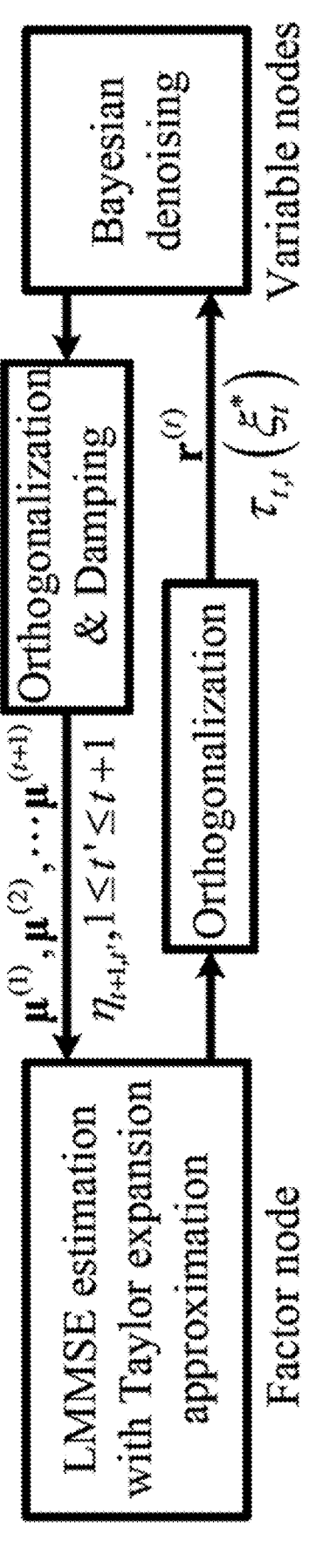
FIG. 4 shows a schematic block diagram of the iterative processing applied in the Low-Complexity Memory Approximate Message Passing detector in accordance with an aspect of the invention.
Figure 5:
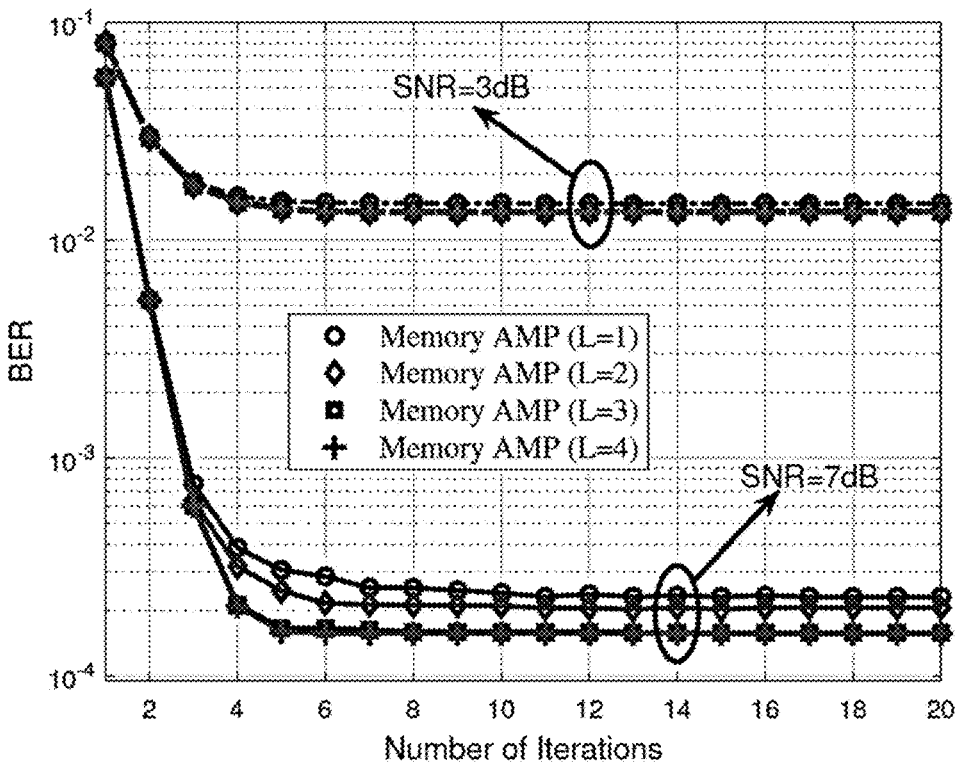
FIG. 5 illustrates the bit error rate performance of the proposed LCM-AMP detector versus the number of iterations for different damping lengths.
Figure 6:
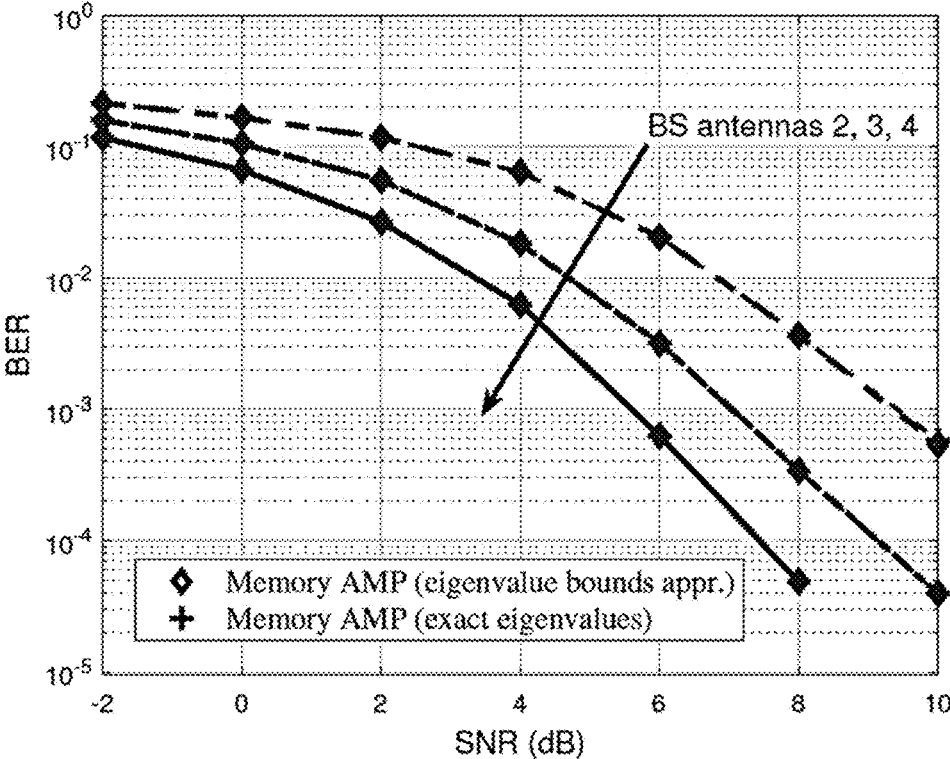
FIG. 6 shows the effects of the eigenvalue bounds approximation on the proposed LCM-AMP detector performance with different numbers of BS antennas.
Figure 7:
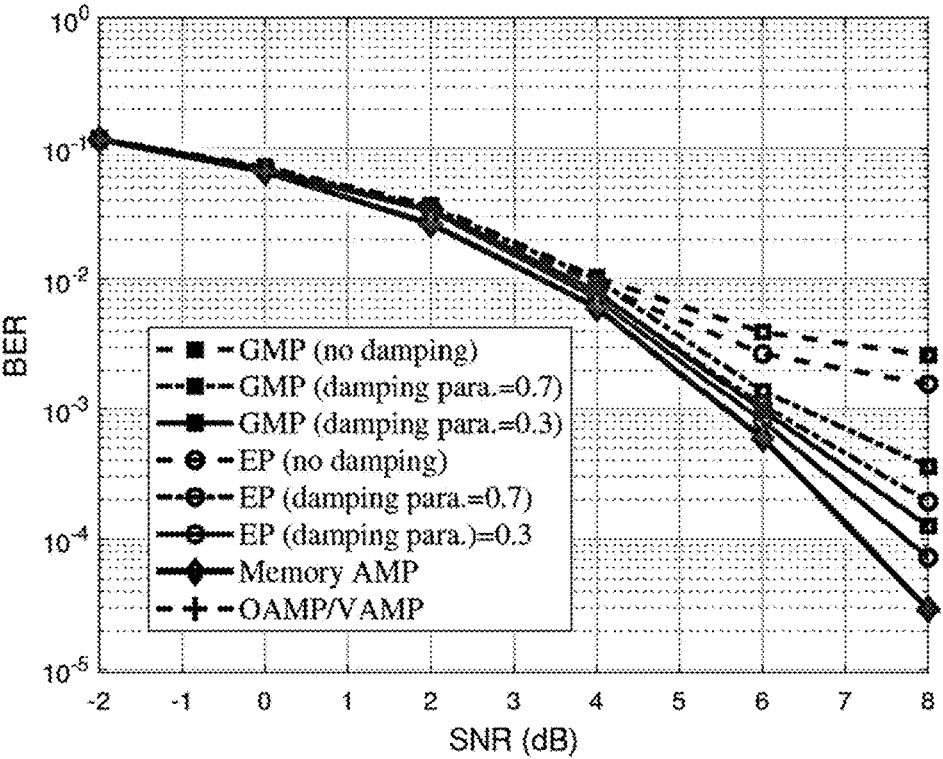
FIG. 7 shows a comparison of the BER performance of different detectors for the exemplary MIMO-OTFS SCMA system.
Figure 8:
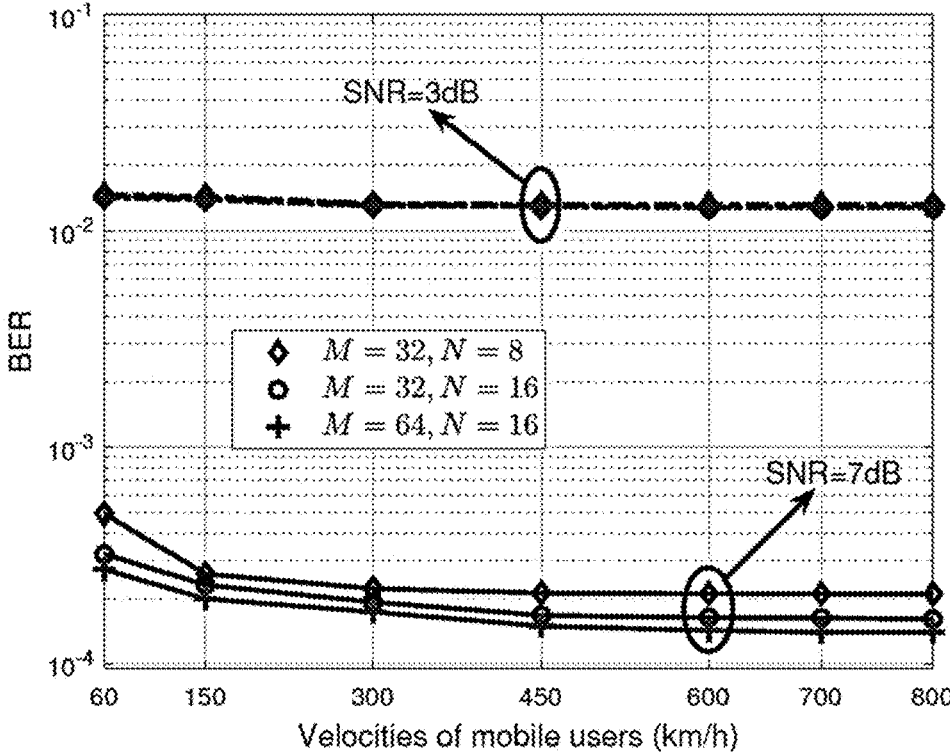
FIG. 8 shows a comparison of the BER performance of the proposed LCM-AMP for different user velocities under various settings of M and N.
Figure 9:
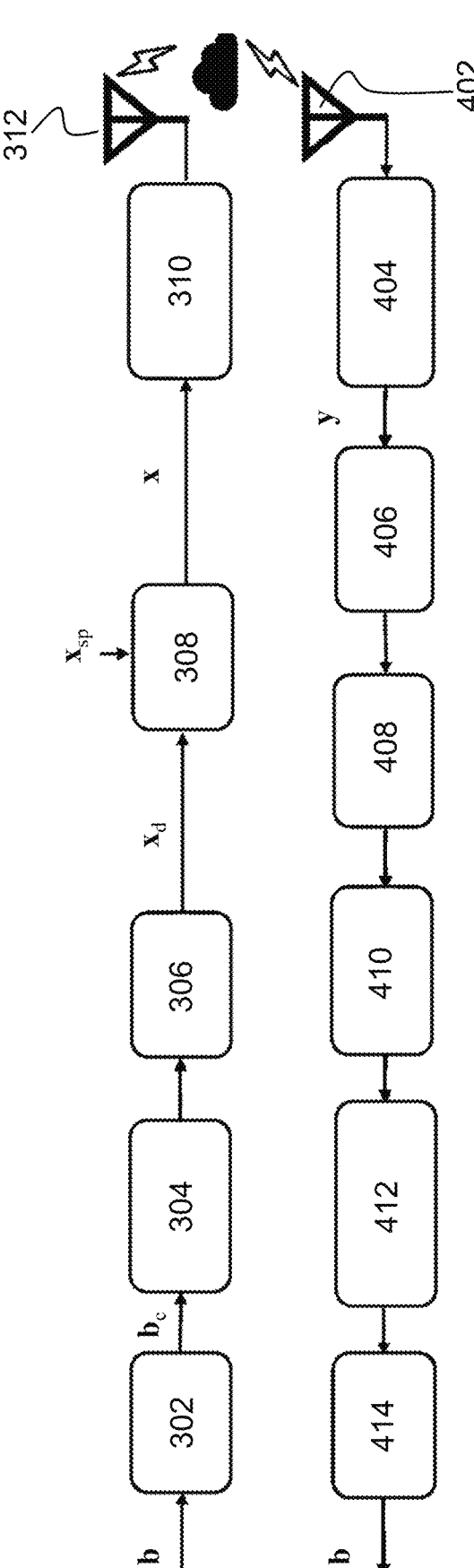
FIG. 9 shows a further representation of an exemplary schematic block diagram of a MIMO OTFS SCMA system.
Figure 10:
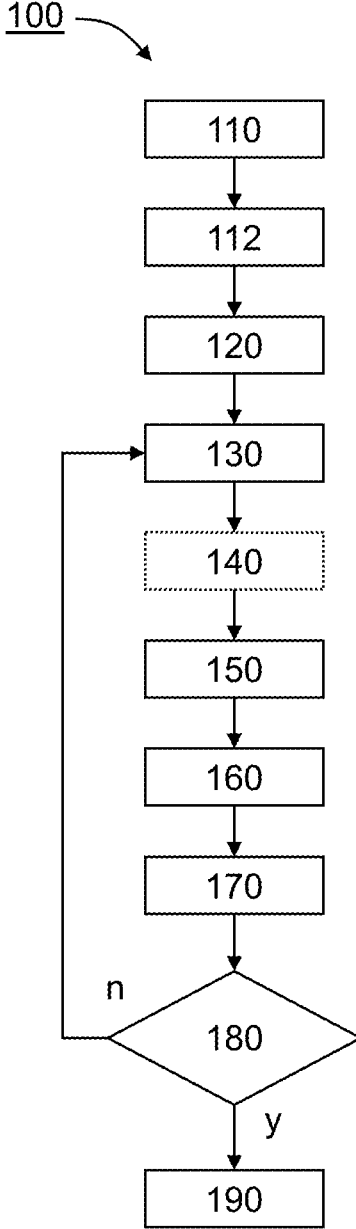
FIG. 10 shows a flow diagram of a method of detecting superimposed SCMA signals from multiple UEs in a receiver of an OTFS communication system in accordance with the first aspect of the invention.

FIGS. 1 to 9 have been described further above and will not be discussed again. FIG. 10 shows an exemplary flow diagram of the method 100 of detecting superimposed SCMA signals from multiple UEs 300, wirelessly received by a receiver 400 of an OTFS communication system in accordance with the first aspect of the invention. After receiving, in step 110, an OTFS-demodulated signal y representing the received signals from all UEs 300 and, in step 112, a corresponding channel matrix H, an initialization step 120 is carried out. Once initialized, steps 130 to 170 are iteratively repeated. In step 130, an a posteriori estimate $\bar{z}^{(t)}$ of the transmitted signal x is determined, using the demodulated signal y, the channel matrix H, as well as respective mean vectors $\mu^{(t-1)}$ and associated variances $\eta_{t,t-1}$ determined for each UE 300 in a respective immediately preceding iteration or, in the first iteration t=1, determined for each UE in the initialization, as inputs. Next, in step 140, from all a posteriori estimates $\bar{z}^{(t)}$ determined so far, and from corresponding current-iteration extrinsic variances $$\tau_{t,t-1}(\xi_t^*),$$

a current-iteration extrinsic mean $$r_c^{(t)}$$

is determined. In step 150 current-iteration a posteriori probabilities $\bar{P}^{(t)}$ are determined for each UE 300 and for each of the non-zero elements of the respective UE's 300 SCMA codebook $A_{j,j}$. The determination is based on based on the current-iteration extrinsic mean $$r_c^{(t)}$$

and the corresponding current-iteration extrinsic variances $$\tau_{t,t-1}(\xi_t^*).$$

Next, in step 160, a current-iteration a posteriori Gaussian distribution $$g_c^{(t)}[i]$$

of the current-iteration a posteriori probabilities $\overline{P}^{(t)}$, and corresponding variance $$\delta_c^{(t)}[i]$$

is calculated for each UE 300 and over all of the non-zero elements of the respective UE's 300 SCMA codebook $\mathbb{A}_{j,j}$. Finally, in step 170, the elements of the respective mean vector $\mu^{(t)}$ and the corresponding extrinsic variances $\eta_{t,t}$ are updated, for each UE 300, based on the a posteriori Gaussian distribution. In step 180 it is checked if a termination criterion is met. In the negative, "no"-branch of step 180, the iteration so repeated with step 130. In the positive, "yes"-branch of step 180, the detected SCMA signals are output to further processes in a receiver 400, such as, e.g., for SCMA de-mapping and subsequent channel decoding.

Figure 11:
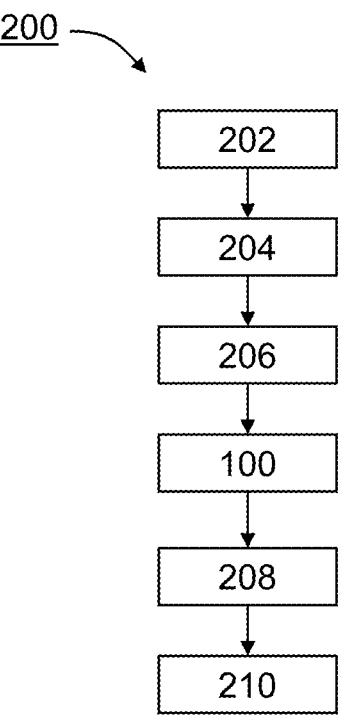
FIG. 11 shows an exemplary flow diagram of a method in accordance with the third aspect of the invention.

FIG. 11 shows an exemplary flow diagram of the method 200 in accordance with the third aspect of the invention. The OTFS-modulated SCMA signals are received in step 202 and OTFS-demodulated in step 204. After a channel estimation in step 206, the process 100 of detecting superimposed SCMA signals from multiple UEs 300 is carried out. Once the process 100 is terminated, the detected SCMA signals are de-mapped in step 208, and the binary data carried therein is reconstructed in step 210.

Figure 12:
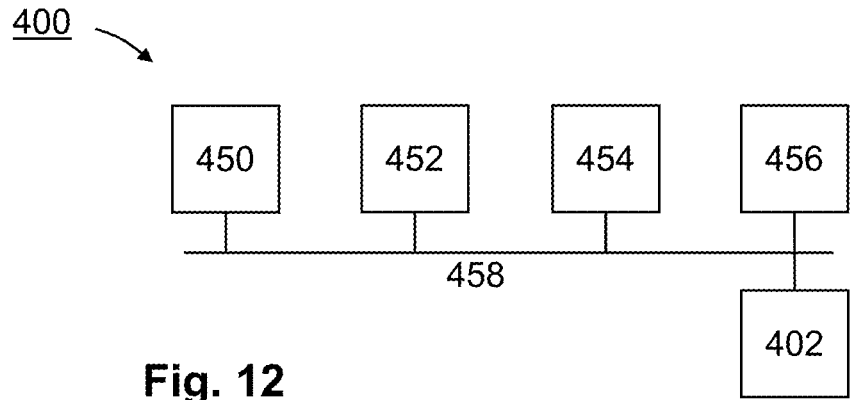
FIG. 12 shows an exemplary block diagram of a receiver in accordance with fourth aspect of the present invention.

FIG. 12 shows an exemplary block diagram of a receiver 400 in accordance with an aspect of the present invention. The receiver 400 comprises one or more microprocessors 450, volatile memory 452, non-volatile memory 454, wireless interface circuitry 456 configured for communicating with a transmitter 300 by receiving electromagnetic signals via multiple antennas 402. The aforementioned elements are communicatively connected via one or more signal or data connections or buses 458. The non-volatile memory 454 stores computer program instructions which, when executed by the microprocessor 450, cause the receiver 400 to execute the method according to the first or third aspect of the present invention as presented herein.

| LIST OF REFERENCE NUMERALS (PART OF THE DESCRIPTION) | |
| --- | --- |
| 100 | method of detecting |
| 110 | receive OTFS-demodulated signal |
| 112 | receive channel matrix |
| 114 | receive further input |
| 120 | initialize and execute iterative |

-continued

| LIST OF REFERENCE NUMERALS (PART OF THE DESCRIPTION) | |
| --- | --- |
| | loop |
| 124 | set first-iteration mean vectors and extrinsic mean to zero |
| 130 | determine a posteriori estimate of the transmitted signal |
| 140 | generate extrinsic mean of received vector |
| 150 | determine a posteriori probabilities |
| 160 | calculate a posteriori Gaussian distribution and variance for each UE |
| 170 | update elements of mean vector for each UE |
| 180 | termination criterion met? |
| 190 | output detected SCMA signals |
| 200 | method of receiving |
| 202 | receiving OTFS-modulated SCMA signals |
| 204 | OTFS demodulating |
| 206 | channel estimation |
| 208 | de-mapping |
| 210 | reconstructing |
| 300 | transmitter/UE |
| 302 | SCMA mapper |
| 304 | SCMA codeword allocator |
| 306 | OTFS modulator |
| 308 | CP adder |
| 310 | transmit filter |
| 312 | antenna |
| 400 | receiver/BS |
| 402 | antenna |
| 404 | receive filter |
| 406 | OTFS demodulator |
| 408 | LCM-AMP detector |
| 410 | SCMA de-mapper |
| 412 | output |
| 450 | microprocessor |
| 452 | volatile memory |
| 454 | non-volatile memory |
| 456 | wireless interface circuitry |
| 458 | signal/data connection/bus |

The invention claimed is:

1. A method for detecting superimposed sparse code multiple access (SCMA) signals from multiple user equipment (UE) received by radio from a receiver of an orthogonal time frequency space communication system, comprising:

receiving an orthogonal time frequency space (OTFS) demodulated signal representing the received signals of all UEs, receiving a corresponding channel matrix, initialising and executing an iteration loop, wherein the iteration loop comprises:

a) determining an a posteriori estimate of the transmitted signal using the demodulated signal, the channel matrix and the respective mean vectors and associated variances that were determined for each UE in a respective immediately preceding iteration or were determined in the first iteration for each UE in the initialisation as input signals, b) generating an extrinsic mean value of the current iteration from all a posteriori estimates determined so far and corresponding extrinsic variances of the current iteration, c) Determining a posteriori probabilities for each UE and for each of the non-zero elements of the SCMA codebook of the respective UE, based on the extrinsic mean value of the current iteration and the corresponding extrinsic variances of the current iteration, d) Calculating an a posteriori Gaussian distribution of the a posteriori probabilities of the current iteration and the corresponding variance for each UE and over all non-zero elements of the SCMA codebook of the respective UE, e) updating the elements of the respective mean vector and the corresponding extrinsic variances for each UE based on the a posteriori Gaussian distribution, and repeating steps a) to e) until a termination criterion is met.

2. The method according to claim 1, wherein the initialisation comprises setting the mean vectors of the first iteration and the extrinsic mean of the first iteration to zero and/or setting the extrinsic variances ($\eta_{0,0}$) to $$\eta_{0,0} = \left( \frac{1}{\mathcal{N}} y^H y - \frac{\mathcal{M} \sigma^2}{\mathcal{N}} \right) / a_0,$$

where $$\mathcal{N} = \frac{MNJD}{K}$$

and $\mathcal{M} =$ UMN, with D being the number of non-zero entries of the SCMA code word, J is the number of independent UEs, K is the dimension of the SCMA code word, M and N are the number of columns and rows of the OTFS delay-Doppler plane, and U is the number of receiving antennas of the base station, and where $\sigma^2$ is the variance of the Gaussian distribution.

3. The method according to claim 1, wherein the initialisation comprises receiving at least one attenuation length, a maximum number of iterations and/or the minimum and maximum eigenvalues of the product of the channel matrix and its conjugate complex transpose as further input variables.

4. The method according to claim 3, wherein the initialisation comprises setting the iteration counter to 1 and/or setting a positive relaxation eigenvalue parameter to the mean value of the minimum and maximum eigenvalues of the product of the channel matrix and its complex conjugate transpose.

5. The method according to claim 1, wherein the determination of the a posteriori estimate of the transmitted signal comprises the use of finite terms of matrix Taylor series to approximately determine the matrix inverse with a linear minimum mean square error.

6. The method according to claim 1, wherein the update comprises applying a Gaussian message combination.

7. The method according to claim 1, wherein, for updating the elements of the respective mean vector and the corresponding extrinsic variances, the variances of the current iteration of the a posteriori probabilities of the current iteration are averaged.

8. The method according to claim 1, wherein the iteration is terminated after a predetermined number of iterations if the difference between an a posteriori estimate of the transmitted signal of a current iteration and an immediately preceding iteration is below a predetermined value, when the a posteriori variance falls below a predetermined value and/or if the difference between an a posteriori estimate of the transmitted signal of a current iteration and an extrinsic mean value of the current iteration is below a predetermined value.

9. The method according to claim 1, further comprising dynamically adjusting the attenuation length based on the signal-to-noise ratio of the received signal.

10. A detector of a receiver set up to receive superimposed OTFS-modulated SCMA signals from multiple UEs, wherein the detector comprises one or more software and/or hardware blocks or modules for receiving an OTFS-demodulated signal representing the received signals of all UEs, a corresponding channel matrix, for initialising and executing an iteration loop implementing steps a) to e) of the method according to claim 1, for detecting SCMA signals of individual UEs in the received superimposed OTFS-modulated SCMA signals, and for outputting the detected SCMA signals to an SCMA inverse mapper.

11. A radio receiver of an OTFS communication system, comprising one or more antennas for receiving superimposed OTFS-modulated SCMA signals from multiple UEs on an OTFS communication channel, wherein the received signals are fed to an OTFS demodulator configured to output a received signal representing the received signals of all UEs to a channel estimator, wherein the channel estimator is configured to output an estimate of the coefficients of the channel to a signal detector according to claim 10, wherein the signal detector is configured to detect SCMA signals from individual UEs and for outputting detected SCMA signals to an SCMA inverse mapper, wherein the SCMA inverse mapper supplies inverse mapped signals to a channel decoder, the output of which is a reconstructed version of the binary data sequences transmitted by the respective UEs.

12. The radio receiver according to claim 11, wherein the OTFS demodulator, the channel estimator, the signal detector), the SCMA inverse mapper and/or the channel decoder are implemented as software or hardware blocks or modules or as a combination thereof.

13. The radio receiver according to claim 11, which further comprises one or more microprocessors, volatile and non-volatile memory, which are physically or logically connected to the software or hardware blocks or modules or a combination thereof, which implement the OTFS demodulator, the channel estimator, the signal detector, the SCMA demodulator, the channel estimator, the signal detector, the SCMA remapper and the channel decoder, wherein the non-volatile memory stores computer program instructions which, when executed by the one or more microprocessors, cause the one or more microprocessors to control the software or hardware blocks or modules or a combination thereof to perform a method for detecting superimposed sparse code multiple access signals from multiple user equipment received by radio from a receiver of an orthogonal time frequency space communication system, the method comprising:

receiving an OTFS demodulated signal representing the received signals of all UEs, receiving a corresponding channel matrix, initialising and executing an iteration loop, wherein the iteration loop comprises:

a) determining an a posteriori estimate of the transmitted signal using the demodulated signal, the channel matrix and the respective mean vectors and associated variances that were determined for each UE in a respective immediately preceding iteration or were determined in the first iteration for each UE in the initialisation as input signals,

b) generating an extrinsic mean value of the current iteration from all a posteriori estimates determined so far and corresponding extrinsic variances of the current iteration, c) Determining a posteriori probabilities for each UE and for each of the non-zero elements of the SCMA codebook of the respective UE, based on the extrinsic mean value of the current iteration and the corresponding extrinsic variances of the current iteration, d) Calculating an a posteriori Gaussian distribution of the a posteriori probabilities of the current iteration and the corresponding variance for each UE and over all non-zero elements of the SCMA codebook of the respective UE, e) updating the elements of the respective mean vector and the corresponding extrinsic variances for each UE based on the a posteriori Gaussian distribution, and repeating steps a) to e) until a termination criterion is met.

14. A non-transitory computer program product comprising computer program instructions which, when executed by a microprocessor, cause the computer and/or hardware blocks, modules or components of a receiver according to claim 11 of an OFTS transmission system to execute a method for detecting superimposed sparse code multiple access signals from multiple user equipment received by radio from a receiver of an orthogonal time frequency space communication system, the method comprising:

receiving an OTFS demodulated signal representing the received signals of all UEs, receiving a corresponding channel matrix, initialising and executing an iteration loop, wherein the iteration loop comprises:

a) determining an a posteriori estimate of the transmitted signal using the demodulated signal, the channel matrix and the respective mean vectors and associated variances that were determined for each UE in a respective immediately preceding iteration or were determined in the first iteration for each UE in the initialisation as input signals, b) generating an extrinsic mean value of the current iteration from all a posteriori estimates determined so far and corresponding extrinsic variances of the current iteration, c) Determining a posteriori probabilities for each UE and for each of the non-zero elements of the SCMA codebook of the respective UE, based on the extrinsic mean value of the current iteration and the corresponding extrinsic variances of the current iteration, d) Calculating an a posteriori Gaussian distribution of the a posteriori probabilities of the current iteration and the corresponding variance for each UE and over all non-zero elements of the SCMA codebook of the respective UE, e) updating the elements of the respective mean vector and the corresponding extrinsic variances for each UE based on the a posteriori Gaussian distribution, and repeating steps a) to e) until a termination criterion is met.

15. A non-transitory computer-readable medium that retrieves or stores the computer program product according to claim 14.

16. A non-transitory computer program product comprising computer program instructions which, when executed by a microprocessor, cause the computer and/or hardware blocks, modules or components of a detector according to claim 10 to execute a method for detecting superimposed sparse code multiple access signals from multiple user equipment received by radio from a receiver of an orthogonal time frequency space communication system, the method comprising:

receiving an OTFS demodulated signal representing the received signals of all UEs, receiving a corresponding channel matrix, initialising and executing an iteration loop, wherein the iteration loop comprises:

a) determining an a posteriori estimate of the transmitted signal using the demodulated signal, the channel matrix and the respective mean vectors and associated variances that were determined for each UE in a respective immediately preceding iteration or were determined in the first iteration for each UE in the initialisation as input signals, b) generating an extrinsic mean value of the current iteration from all a posteriori estimates determined so far and corresponding extrinsic variances of the current iteration, c) Determining a posteriori probabilities for each UE and for each of the non-zero elements of the SCMA codebook of the respective UE, based on the extrinsic mean value of the current iteration and the corresponding extrinsic variances of the current iteration, d) Calculating an a posteriori Gaussian distribution of the a posteriori probabilities of the current iteration and the corresponding variance for each UE and over all non-zero elements of the SCMA codebook of the respective UE, e) updating the elements of the respective mean vector and the corresponding extrinsic variances for each UE based on the a posteriori Gaussian distribution, and repeating steps a) to e) until a termination criterion is met.

17. A method for receiving binary data sequences transmitted simultaneously by multiple UEs as OTFS-modulated SCMA signals, comprising:

a) subjecting the received OTFS signal to OTFS demodulation, b) performing a channel estimation on the demodulated OTFS signal, c) detecting the superimposed SCMA signals by applying the method according to claim 1, d) remapping the detected SCMA signals, and e) reconstructing the binary data from the remapped detected SCMA signals.

18. A radio communication device comprising one or more microprocessors, volatile and non-volatile memory, a radio interface circuit configured to transmit and/or receive electromagnetic signals via one or more antennas, wherein the non-volatile memory stores computer program instructions which, when executed by the microprocessor, configure the radio device to perform the methods according to claim 1.

\* \* \* \* \*